United States Patent
Shimizu et al.

(10) Patent No.: US 9,723,473 B2
(45) Date of Patent: Aug. 1, 2017

(54) MILLIMETER WAVE COMMUNICATION SYSTEM

(71) Applicant: TOYOTA JIDOSHA KABUSHIKI KAISHA, Toyota-shi, Aichi-ken (JP)

(72) Inventors: Takayuki Shimizu, Mountain View, CA (US); Gaurav Bansal, San Jose, CA (US)

(*) Notice: Subject to any disclaimer, the term of this patent is extended or adjusted under 35 U.S.C. 154(b) by 0 days.

(21) Appl. No.: 14/883,416

(22) Filed: Oct. 14, 2015

(65) Prior Publication Data

US 2017/0111122 A1    Apr. 20, 2017

(51) Int. Cl.
*H04W 8/00*        (2009.01)
*H04W 4/00*        (2009.01)
(Continued)

(52) U.S. Cl.
CPC ............. *H04W 8/005* (2013.01); *H04L 67/12* (2013.01); *H04W 4/008* (2013.01); *H04W 4/027* (2013.01); *H04W 76/023* (2013.01)

(58) Field of Classification Search
CPC .. H04B 7/0617; H04B 7/0619; H04B 7/0834; H04W 88/06; H04W 16/28; H04W 28/18;
(Continued)

(56) References Cited

U.S. PATENT DOCUMENTS 8,379,560 B2    2/2013    Kessleman et al.
8,711,784 B2    4/2014    Cordeiro et al.
(Continued)

FOREIGN PATENT DOCUMENTS

CN    WO 2013097187 A1 *  7/2013 ............ H04W 4/005
WO    WO2014074894 A1    5/2014

OTHER PUBLICATIONS

Nitsche, Thomas et al., "IEEE 802.11ad: directional 60 GHz communication for multi-Gigabit-per-second Wi-Fi [Invited Paper]," IEEE Communications Magazine, Dec. 2014, pp. 132-141.
(Continued)

*Primary Examiner* — Gennadiy Tsvey
(74) *Attorney, Agent, or Firm* — Burbage Law, P.C.; Jon-Michael Burbage; Elizabeth Ruzich

(57) ABSTRACT

The disclosure includes a system and method for a first communication device to provide a millimeter wave communication service to a second communication device. The method may be performed by the first communication device. The method includes broadcasting a service discovery message describing the availability of the first communication device to provide the millimeter wave communication service. The method includes receiving a first handshake message that describes a request of the second communication device to receive the millimeter wave communication service from the first communication device and transmitting a second handshake message acknowledging receipt of the first handshake message. The method includes determining a future location of the second communication device at a future time. The method includes aligning a beam of a first millimeter wave communication unit of the first communication device with the future location and providing the millimeter wave communication service to the second communication device.

20 Claims, 12 Drawing Sheets

(51) Int. Cl.
*H04W 76/02* (2009.01)
*H04L 29/08* (2006.01)
*H04W 4/02* (2009.01)

(58) Field of Classification Search
CPC ....... H04W 4/028; H04W 4/04; H04W 76/02; H04W 8/005; H04W 4/027
See application file for complete search history.

(56) References Cited

U.S. PATENT DOCUMENTS

| | | | |
|---|---|---|---|
| 9,048,894 B2 | 6/2015 | Wang et al. | |
| 9,096,128 B2* | 8/2015 | Shaw | B60K 35/00 |
| 2009/0213901 A1* | 8/2009 | Berens | H04B 10/90 |
| | | | 375/130 |
| 2012/0057575 A1 | 3/2012 | Taghavi Nasrabadi et al. | |
| 2013/0301584 A1* | 11/2013 | Addepalli | H04W 4/046 |
| | | | 370/329 |
| 2014/0136730 A1* | 5/2014 | Wahler | H04W 4/04 |
| | | | 709/242 |
| 2014/0204859 A1 | 7/2014 | Cordiero et al. | |
| 2014/0266900 A1* | 9/2014 | Kasher | H04B 7/0617 |
| | | | 342/372 |
| 2014/0297116 A1* | 10/2014 | Anderson | H02K 5/12 |
| | | | 701/37 |
| 2014/0369330 A1* | 12/2014 | Sinha | H04W 8/005 |
| | | | 370/338 |
| 2015/0092676 A1* | 4/2015 | Periyalwar | H04W 76/025 |
| | | | 370/329 |
| 2015/0145995 A1* | 5/2015 | Shahraray | B60R 1/00 |
| | | | 348/148 |
| 2015/0264583 A1* | 9/2015 | Sundstrom | H04W 16/28 |
| | | | 342/373 |
| 2016/0016583 A1* | 1/2016 | Ihlenburg | G06F 17/00 |
| | | | 701/28 |
| 2016/0047884 A1* | 2/2016 | Zhang | H04B 7/0617 |
| | | | 342/458 |
| 2016/0080086 A1* | 3/2016 | Campos | H04B 10/1141 |
| | | | 398/115 |

OTHER PUBLICATIONS

Crow, Brian P. et al., "IEEE 802.11 Wireless Local Area Networks," IEEE Communications Magazine, Sep. 1997, pp. 116-126.

Tsang, Y. Ming et al., "Coding the Beams: Improving Beamforming Training in mmWave Communication System," IEEE Global Telecommunications Conference, Dec. 2011, 6 pages.

* cited by examiner

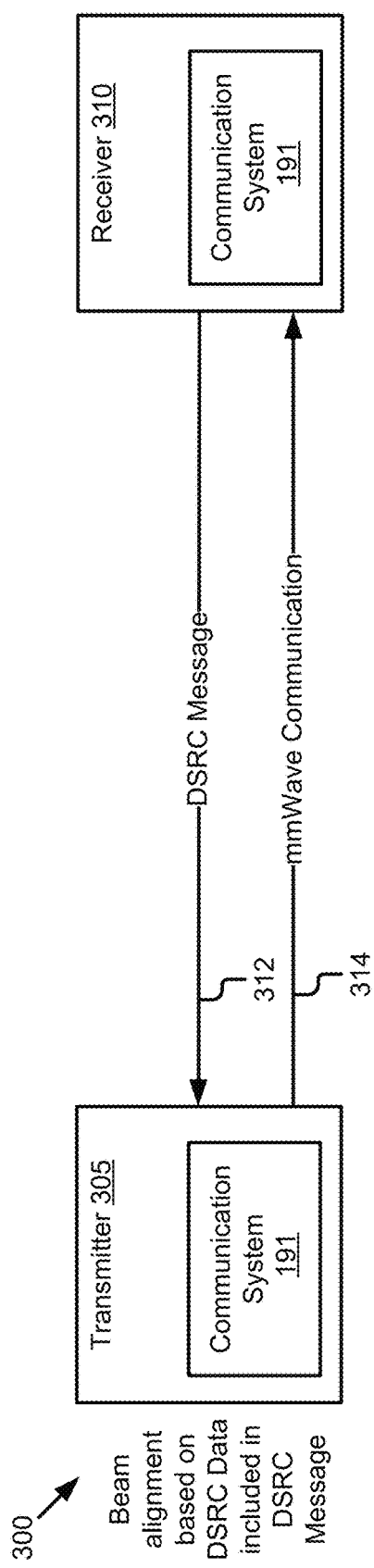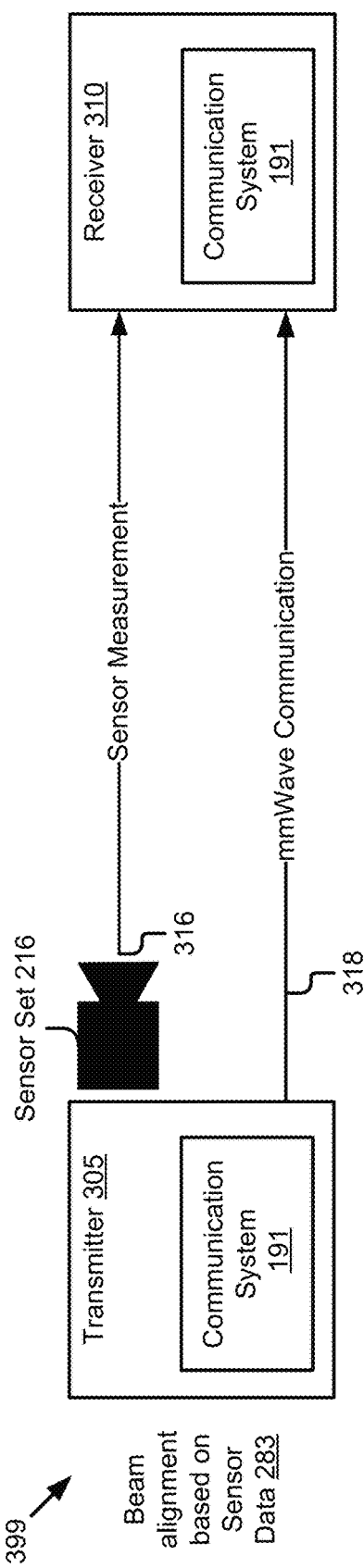
Figure 3A
Figure 3B

600

- Reduce the latency for beam alignment because, for example, no feedback may be required from the receiver in beam alignment
- Works for various device sensor capability (i.e., one or multiple combination of radar, LIDAR, camera, DSRC)
- Able to track the receiver's movement and update the beam direction accordingly by predicting the receiver's movement

Figure 6

1000

- Expand the coverage of device discovery for millimeter wave communications
- Facilitate the initiation of device millimeter wave communication for devices traveling at speeds greater than 5.7 miles per hour relative to one another and located at distances greater than 100 meters relative to one another
- Optionally offload DSRC traffic to millimeter wave communication bands
- Improve spatial reuse with directional millimeter wavecommunication

Figure 10

MILLIMETER WAVE COMMUNICATION SYSTEM

BACKGROUND

The specification relates to a millimeter wave communication system.

Extremely high frequency ("EHF") is the International Telecommunication Union ("ITU") designation for the band of radio frequencies in the electromagnetic spectrum from about 28 to 300 gigahertz ("GHz"). Radio waves in this band have wavelengths from ten to one millimeter, and consequently referred to as millimeter waves ("mmWave" or "mmWaves"). FIG. 1A is a block diagram illustrating a prior art example 199 of the spectrum available via millimeter wave communication.

Millimeter wave communication is beneficial since it enable communication devices to send and receive large amounts of data (e.g., 0 to 1000 gigabytes) in an amount of time that is acceptable to users or within some predetermined safety standard.

SUMMARY

According to one innovative aspect of the subject matter described in this disclosure, a method for implementing full-duplex wireless communications includes broadcasting, by a first communication device, a service discovery message describing the availability of the first communication device to provide a millimeter wave communication service that includes providing one or more of a set of high definition three dimensional maps and local sensor information via millimeter wave communication, wherein the service discovery message is broadcasted via dedicated short range communication (DSRC). The method includes receiving, by the first communication device, a first handshake message transmitted by a second communication device, wherein the first handshake message describes a request to receive the millimeter wave communication service from the first communication device and wherein the first handshake message is received via DSRC and includes DSRC data describing one or more of a location of the second communication device at a specified time, a speed of the second communication device at the specified time and a bearing of the second communication device at the specified time. The method includes transmitting, by the first communication device, a second handshake message acknowledging receipt of the first handshake message, wherein the second handshake message is transmitted via DSRC. The method includes analyzing, by the first communication device, the DSRC data to determine a future location of the second communication device at a future time, wherein the analysis includes estimating the future location based on one or more of the location of the second communication device at the specified time, the speed of the second communication device at the specified time and the bearing of the second communication device at the specified time. The method includes sweeping, by the first communication device, a beam of a first millimeter wave communication unit of the first communication device so that the beam is aligned with the future location of a second millimeter wave communication unit of the second communication device. The method includes providing, by the first communication device, the millimeter wave communication service to the second communication device.

According to another innovative aspect of the subject matter described in this disclosure, a method includes broadcasting, by a first communication device, a service discovery message describing the availability of the first communication device to provide a millimeter wave communication service that includes providing a millimeter wave communication, wherein the service discovery message is broadcasted via a communication method that does not include millimeter wave communication. The method includes discovering, by the first communication device, a second communication device by receiving a first handshake message transmitted by the second communication device, wherein the first handshake message describes a request to receive the millimeter wave communication service from the first communication device and wherein the first handshake message is received via the communication method used for broadcasting the service discovery message. The method includes transmitting, by the first communication device, a second handshake message acknowledging receipt of the first handshake message, wherein the second handshake message is transmitted via the communication method used for broadcasting the service discovery message and receiving the first handshake message. The method includes performing, by the first communication device, a beam alignment operation so that a beam of first millimeter wave communication unit of the first communication device is aligned with an antenna of a second millimeter communication unit of the second communication device, wherein the beam alignment operation is performed based on data describing a location, a speed and a bearing of the second communication device at a specified time and determining a future location of the second communication device at a future time based on the data describing the location, the speed and the bearing of the second communication device at the specified time. The method includes providing, by the first communication device, the millimeter wave communication service to the second communication device.

According to another innovative aspect of the subject matter described in this disclosure, a beam alignment operation may include receiving, by the first communication device, a DSRC message transmitted via DSRC by the second communication device, wherein the DSRC message includes DSRC data describing one or more of a location of the second communication device at a specified time, a speed of the second communication device at the specified time and a bearing of the second communication device at the specified time. The beam alignment operation may include analyzing, by the first communication device, the DSRC data to determine a future location of the second communication device at a future time, wherein the analysis includes estimating the future location based on one or more of the location of the second communication device at the specified time, the speed of the second communication device at the specified time and the bearing of the second communication device at the specified time. The beam alignment operation may include sweeping, by the first communication device, a beam of a first millimeter wave communication unit of the first communication device so that the beam is aligned with the future location of a second millimeter wave communication unit of the second communication device.

According to another innovative aspect of the subject matter described in this disclosure, a beam alignment operation may include measuring, by a sensor set of the first communication device, sensor measurements describing one or more of a location of the second communication device at a specified time, a speed of the second communication device at the specified time and a bearing of the second communication device at the specified time. The beam alignment operation may include storing, by the first communication device, sensor data describing the sensor measurements. The beam alignment operation may include analyzing, by the first communication device, the sensor data to determine a future location of the second communication device at a future time, wherein the analysis includes estimating the future location based on one or more of the location of the second communication device at the specified time, the speed of the second communication device at the specified time and the bearing of the second communication device at the specified time. The beam alignment operation may include sweeping, by the first communication device, a beam of a first millimeter wave communication unit of the first communication device so that the beam is aligned with the future location of a second millimeter wave communication unit of the second communication device.

According to another innovative aspect of the subject matter described in this disclosure, a method includes one or more of the first communication device and the second communication device is a roadside unit ("RSU").

In general, another innovative aspect of the subject matter described in this disclosure may be embodied in methods that include one or more of the first communication device and the second communication device is an on-board unit ("OBU").

According to another innovative aspect of the subject matter described in this disclosure, a method includes the first communication device and the second communication having a relative speed that is within a range of substantially 5.6 miles per hour and substantially 100.1 miles per hour (i.e., greater than 5.6 miles per hour and less than 100.1 miles per hour).

Yet another innovative aspect of the subject matter described in this disclosure may be embodied in methods that include the first communication device and the second communication are separated by a distance that is within a range of substantially 100 meters and substantially 2000.1 meters.

In general, another innovative aspect of the subject matter described in this disclosure may be embodied in methods that include the communication method for the service discovery message, the first handshake message and the second handshake message is selected from a group that includes: DSRC; wireless fidelity; and cellular.

Other aspects include corresponding methods, systems, apparatus, and computer program products for these and other innovative aspects.

The disclosure is particularly advantageous in a number of respects. For example, the system described herein is capable of enabling device discovery and beam alignment for millimeter wave communication among a first communication device and a second communication device in vehicular environments where one or more of the following conditions are present: (1) the first communication device and the second communication device have a relative speed that is within a range of substantially 5.6 miles per hour and substantially 100.1 miles per hour; and (2) the first communication device and the second communication device are separated by a distance that is within a range of substantially 100 meters and substantially 2000.1 meters. The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

FIG. 3A is a block diagram illustrating an example of a system including a transmitter performing a beam alignment for a millimeter wave communication unit of the transmitter based on DSRC data included in a DSRC message transmitted by a receiver.

FIG. 3B is a block diagram illustrating an example of a system including a transmitter performing a beam alignment for a millimeter wave communication unit of the transmitter based on sensor data describing a receiver.

FIG. 6 is a graphical depiction of example benefits of the beam alignment provided by the communication system.

FIG. 10 is a graphical depiction of example benefits of the device discovery provided by the communication system.

DETAILED DESCRIPTION

Figure 1A:
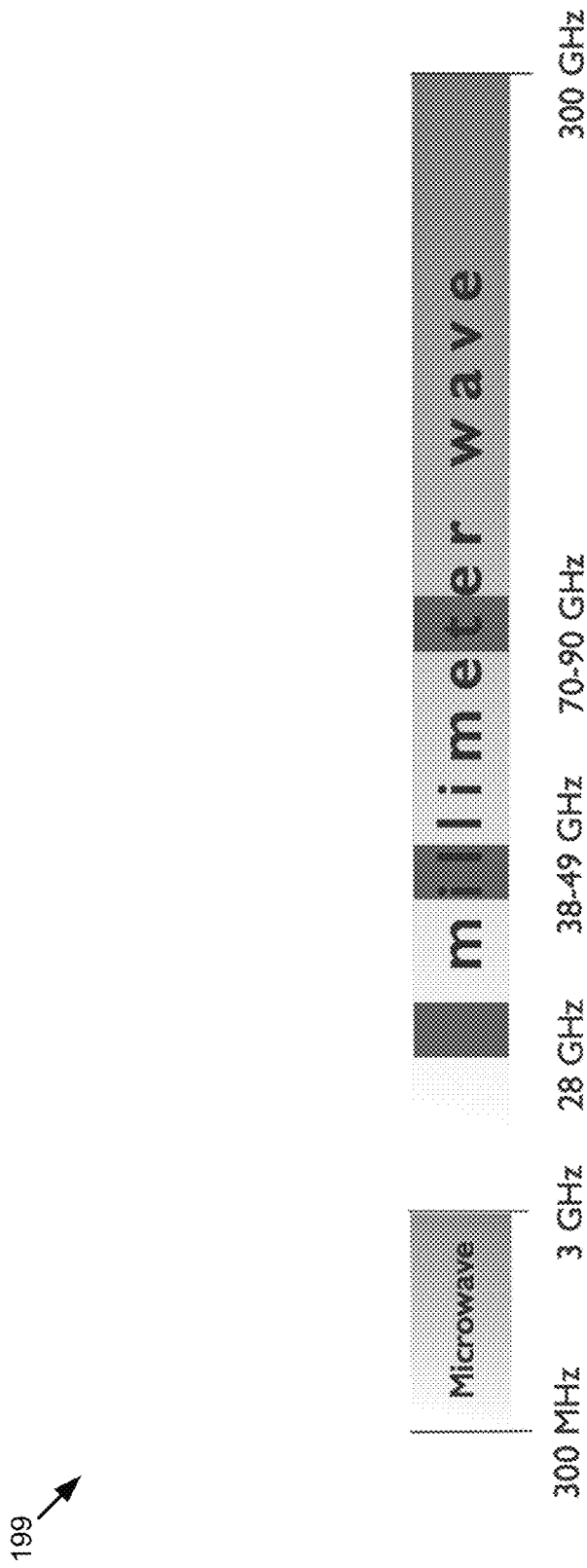
FIG. 1A is a block diagram illustrating a prior art example of the spectrum available via millimeter wave communication.

Millimeter wave communication between two communication devices cannot occur unless: (1) both devices are aware of each other, capable of millimeter wave communication and willing to participate in millimeter wave communication with one another (otherwise known as "device discovery"); and (2) the beam for the millimeter communication unit for one of the communication devices is aligned with the antenna of the millimeter communication unit for the other communication device (otherwise known as "beam alignment").

Existing methods for device discovery for millimeter communication include: (1) omni directional beacons; and (2) directional beacons.

Omni directional beacons cannot discover devices that are traveling faster than 5.6 miles per hour (i.e., a typical maximum walking speed for an average human). As a result, omni directional beams cannot provide device discovery for environments where the device to be discovered is traveling faster than 5.6 miles per hour. However, vehicles typically travel at speeds greater than 5.6 miles per hour. As a result, omni directional beacons are unable to provide device discovery for vehicular applications of millimeter communication.

The maximum range for an omni directional beacon is only 10 meters. As a result, devices using omni directional beacons cannot discover any devices that are located more than 10 meters from them. However, vehicles and other roadway devices are typically separated by distances greater than 10 meters. As a result, omni directional beacons are unable to provide device discovery for vehicular applications of millimeter communication for this additional reason.

Directional beacons cannot discover devices that are traveling faster than 5.6 miles per hour. As a result, omni directional beams cannot provide device discovery for environments where the device to be discovered is traveling faster than 5.6 miles per hour. However, vehicles typically travel at speeds greater than 5.6 miles per hour. As a result, directional beacons are unable to provide device discovery for vehicular applications of millimeter communication.

The maximum range for a directional beacon is only 100 meters. As a result, devices using directional beacons cannot discover any devices that are located more than 100 meters from them. However, vehicles and other roadway devices are typically separated by distances greater than 100 meters. As a result, directional beacons are unable to provide device discovery for vehicular applications of millimeter communication for this additional reason.

Accordingly, current technology is unable to perform device discovery for devices traveling faster than 5.6 miles per hour and located at a distance greater than 100 meters from the discovering device.

The existing methods for beam alignment for millimeter communication is known as "beam training by sweeping." However, this beam alignment method is slow and unable to perform beam alignment for devices traveling faster than 5.6 miles per hour. However, vehicles typically travel at speeds greater than 5.6 miles per hour. As a result, the technology known as beam training by sweeping is unable to provide beam alignment for vehicular applications of millimeter communication.

The following disclosure provides, among other things, methods and systems for providing beam alignment and device discovery for vehicular applications of millimeter communication.

System Overview

Figure 1B:
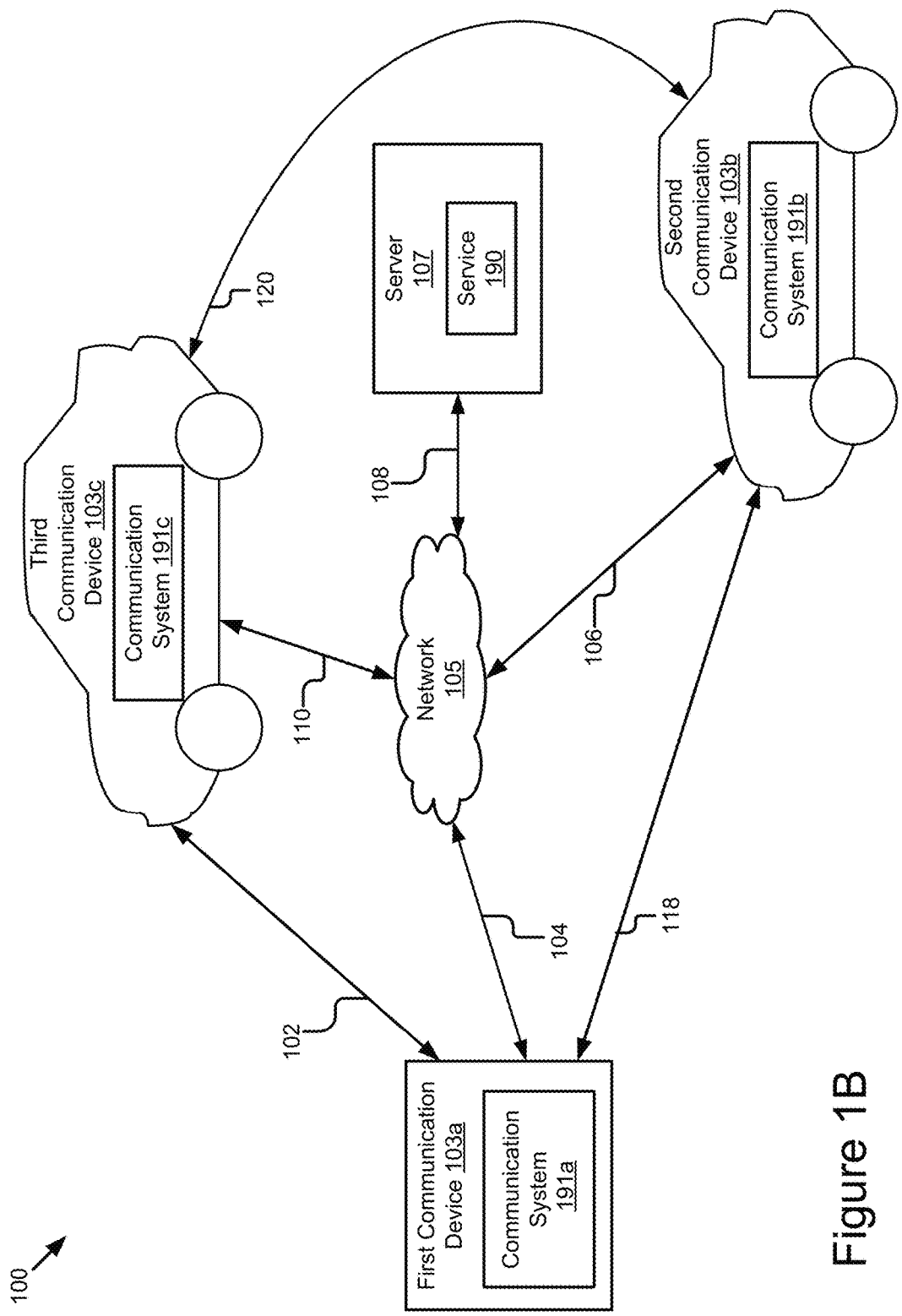
FIG. 1B is a block diagram illustrating an example system for implementing millimeter wave communication between communication devices.

FIG. 1B is a block diagram illustrating an example system 100 for implementing millimeter wave communication between communication devices 103a, 103b, 103c. The system 100 includes a server 107, a first communication device 103a, a second communication device 103b, and a third communication device 103c (also referred to herein individually and collectively as communication device 103). The system 100 may include other servers or devices not shown in FIG. 1 including, for example, a traffic server for providing traffic data, a weather server for providing weather data, and a map server for providing map data, etc.

In some implementations, these entities of the system 100 may be communicatively coupled via a network 105. The first communication device 103a may be communicatively coupled to the network 105 via a signal line 104. The second communication device 103b may be communicatively coupled to the network 105 via a signal line 106. The third communication device 103c may be communicatively coupled to the network 105 via a signal line 110. The server 107 may be communicatively coupled to the network 105 via a signal line 108. Each of the signal lines 104, 106, 108, and 110 may represent a wired connection or a wireless connection (e.g., millimeter wave communication, dedicated short range communication (DSRC), wireless fidelity (Wi-Fi), cellular (e.g., 3G, 4G, LTE, etc.), Bluetooth®, etc.) between devices and the network or devices and other devices.

In some implementations, the communication devices 103a, 103b, and 103c may communicate with each other directly. The first communication device 103a may be communicatively coupled to the second communication device 103b via a signal line 118. The first communication device 103a may be communicatively coupled to the third communication device 103c via a signal line 102. The third communication device 103c may be communicatively coupled to the second communication device 103b via a signal line 120. Each of the signal lines 102, 118, and 120 may represent a wired connection or a wireless connection. While the communication devices 103a, 103b, and 103c may be coupled to the network 105 via signal lines 118, 106, and 110 respectively for communication with the server 107, the communication devices 103a, 103b, and 103c may communicate with each other directly using wireless connections without accessing the network 105 (e.g., illustrated as signal lines 102, 118, and 120 in FIG. 1).

For example, the second communication device 103b may transmit a DSRC message to the third communication device 103c via signal line 120. The third communication device 103c may detect the presence of the second communication device 103b based on the DSRC message. The third communication device 103c may transmit a millimeter wave communication to the second communication device 103b via the signal line 120. Accordingly, the signal lines 102, 118, and 120 may represent various types of communication between the communications devices 103.

The communication devices 103a, 103b, and 103c in FIG. 1B are used by way of example. While FIG. 1B illustrates one server 107 and three communication devices 103a, 103b, 103c, the present disclosure applies to a system architecture having one or more servers 107 and one or more communication devices 103. Furthermore, although FIG. 1B illustrates one network 105 coupled to the communication devices 103 and the server 107, in practice one or more networks 105 can be connected to these entities.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or may include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. The network 105 may also include functionality or hardware to support cellular communications between entities of the system 100.

The first communication device 103a may be a computing device that includes a memory and a processor, for example, a server, a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 105. A user may interact with the first communication device 103a. As illustrated in FIG. 1, the first communication device 103a includes a communication system 191a.

The second communication device 103b may be a mobile communication node. For example, the second communication device 103b may include an onboard communication device included in one of a vehicle (e.g., an automobile, a bus, a drone, an airplane, etc.), a bionic implant, or any other mobile system. In some implementations, the second communication device 103b may include a computing device that includes a memory and a processor. A user may interact with the second communication device 103b. As illustrated in FIG. 1, the second communication device 103b includes a communication system 191b.

In some implementations, the second communication device 103b may include one or more sensors (not shown), such as a camera, a LIDAR sensor, a laser altimeter, a navigation sensor (e.g., a global positioning system (GPS) sensor), an infrared detector, a motion detector, a thermostat, a sound detector, and any other type of sensors. For example, the second communication device 103b may include sensors for measuring one or more of a current time, a location (e.g., a latitude, longitude, and altitude of a location) of a communication device 103, an acceleration of a communication device 103, a velocity of a communication device 103, a fuel tank level, and a battery level of a communication device 103, etc.

The third communication device 103c may be similar to the second communication device 103b, and so, that description will not be repeated here. As illustrated in FIG. 1B, the third communication device 103c includes a communication system 191c.

The communication systems 191a, 191b, 191c (also referred to herein individually and collectively as communication system 191) can be a system for implementing wireless communications between communication devices 103. In some implementations, the communication systems 191 may perform one or more of the steps of methods 400, 500 and 800 described below with reference to FIGS. 4, 5 and 8.

In some implementations, the communication system 191 can be implemented using hardware including a field-programmable gate array ("FPGA") or an application-specific integrated circuit ("ASIC"). In some other implementations, the communication system 191 can be implemented using a combination of hardware and software. The communication system 191 may be stored in a combination of the devices (e.g., servers or other devices), or in one of the devices.

In some implementations, the first communication device 103a may include a roadside unit ("RSU" if singular or "RSUs" if plural). An RSU may include a computing device on a roadside that provides connectivity to passing mobile devices such as the second communication device 103b or the third communication device 103c. Connectivity may include, for example, communicative coupling to the network 105 or one or more of the communication devices 103. For example, the communication system 191a may include an RSU.

In some implementations, one or more of the second communication device 103b or the third communication device 103c may include an on-board unit ("OBU" if singular or "OBUs" if plural). An OBU may include a communication device mounted on or inside of a vehicle or some other mobile device. The OBU may include hardware or software that enables DSRC communications with other OBUs or RSUs. For example, one or more of the communication applications 191b and 191c may include an OBU.

In some implementations, the first, second, and third communication devices 103a, 103b, and 103c may be the same type of devices. For example, the first, second, and third communication devices 103a, 103b, and 103c may be onboard communication devices installed in vehicles. In some other implementations, the first, second, and third communication devices 103a, 103b, and 103c may be different types of devices. For example, the second communication device 103b may be a device installed in a vehicle while the first and third communication devices 103a and 103c may be a server including a processor and a memory.

The communication system 191 is described in more detail below with reference to FIGS. 2-10.

One or more of the second communication device 103b and the third communication device 103c may include one or more special purpose computing device such as an onboard vehicle computer. The onboard vehicle computer may be configured to perform one or more specialized vehicular functions such as managing wireless communications among vehicles, RSUs, OBUs, and other roadside or roadway devices having wireless communication or network communication capabilities.

In some implementations, one or more of the communication devices 103 may be traveling at speeds ranging from 5.7 to 100 miles per hour when transmitting and receiving communications from the other entities of the system 100 or otherwise performing one or more steps of the methods 400, 500, 800 described below with reference to FIG. 4, 5 or 8. For example, the second communication device 103b may discover the third communication device 103c in accordance with method 800 while one or more of the communication devices 103b, 103c are traveling at speeds ranging from 5.7 to 100 miles per hour. The second communication device 103b may also perform a beam alignment relative to the third communication device 103c in accordance with methods 400 or 500 while one or more of the communication devices 103b, 103c are traveling at speeds ranging from 5.7 to 100 miles per hour. The second communication device 103b may then transmit a millimeter wave communication to the third communication device 103c since (1) the third communication device 103c is discovered by the second communication device 103b and (2) the respective millimeter wave communication units of the communications devices 103b, 103c are aligned for successful transmission and reception of millimeter wave communications.

The server 107 can be a hardware server that includes a processor, a memory, and network communication capabilities. The server 107 may send and receive data to and from other entities of the system 100 via the network 105. The server 107 may provide a service 190 to one or more of the other entities of the system 100. For example, the service 190 may include a social networking service in which one or more users are connected with one another based on common features described by a social graph.

Example Communication System

Figure 2A:
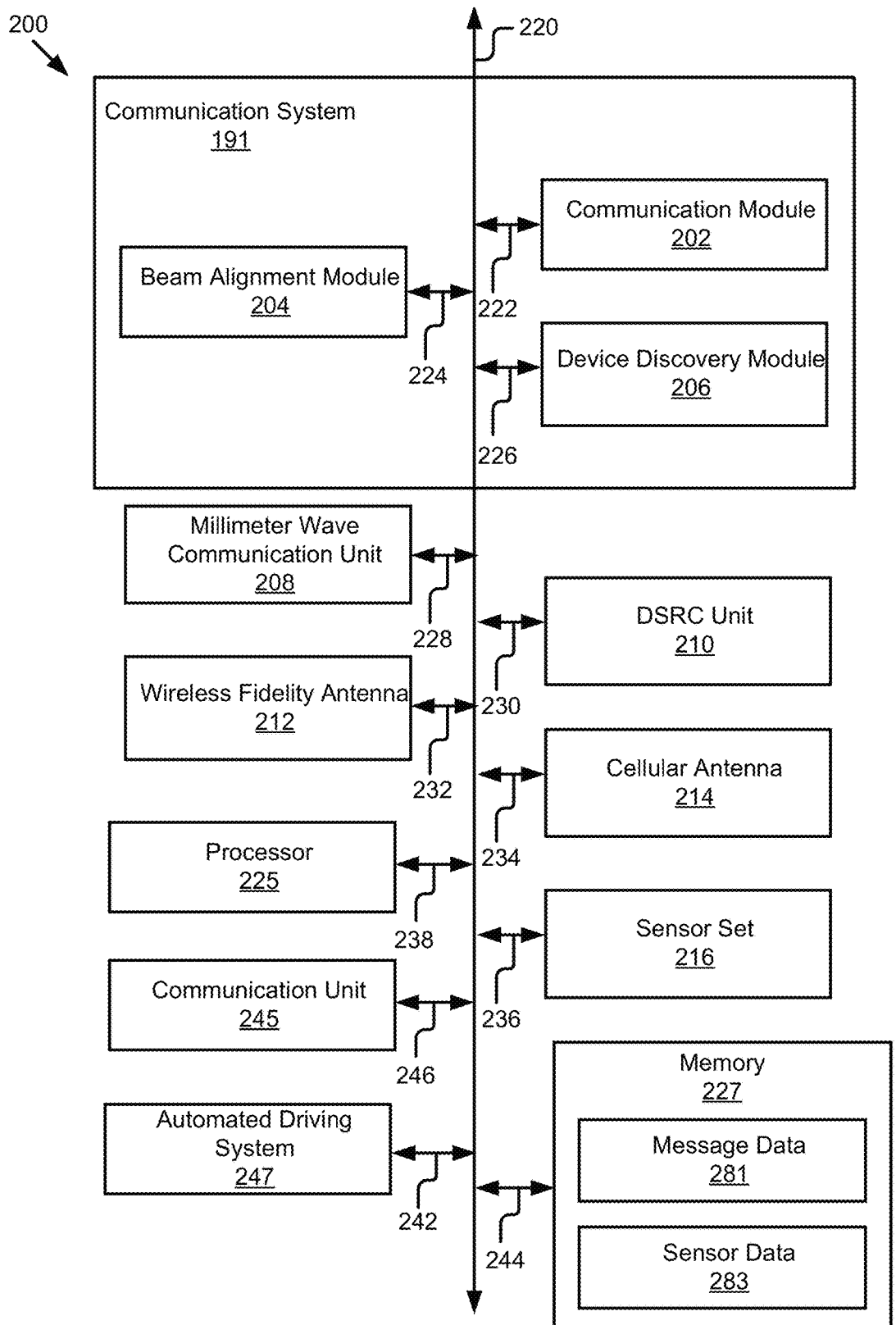
FIG. 2A is a block diagram illustrating an example computing device that includes an example communication system.

Referring now to FIG. 2A, an example of the communication system 191 is shown in more detail. FIG. 2A is a block diagram of a computing device 200 that includes the communication system 191, a millimeter wave communication unit 208, a DSRC unit 210, a wireless fidelity antenna 212, a cellular antenna 214, a sensor set 216, a processor 225, a communication unit 245, an automated driving system 247, and a memory 227 according to some examples.

The components of the computing device 200 are communicatively coupled by a bus 220. The implementation of the bus 220 in FIG. 2A is illustrated by way of example and not intended to limit the implementation of the computing device 200. For example, the components of the computing device 200 may be coupled using other mechanisms such as internal connectivity. In some implementations, the computing device 200 can be one or more of the following: the first communication device 103a; the second communication device 103b; the third communication device 103c; the server 107; and any other server or device that may include the communication system 191.

The millimeter wave communication unit 208 is communicatively coupled to the bus 220 by signal line 228. The DSRC unit 210 is communicatively coupled to the bus 220 by signal line 230. The wireless fidelity antenna 212 is communicatively coupled to the bus 220 by signal line 232. The cellular antenna 214 is communicatively coupled to the bus 220 by signal line 234. The processor 225 is communicatively coupled to the bus 220 by signal line 238. The sensor set 216 is communicatively coupled to the bus 220 by signal line 236. The communication unit 245 is communicatively coupled to the bus 220 by signal line 246. The automated driving system 247 is communicatively coupled to the bus 220 by signal line 242. The memory 227 is communicatively coupled to the bus by signal line 244.

The millimeter wave communication unit 208 may include hardware and software configured to transmit and receive millimeter wave communications. The hardware may include an antenna configured to receive and transmit millimeter wave communications. The software may include code and routines configured to prepare and transmit millimeter wave communication messages via the millimeter wave communication antenna. The software may be configured to analyze millimeter wave communication messages received via the millimeter wave communication antenna and determine the content of the millimeter wave communication messages including any data included in the received millimeter wave communication messages. The data included in any received or transmitted millimeter wave communication messages may be stored as message data 281 stored on the memory 227.

In some implementations, the millimeter wave communication unit 208 may be an element or a subcomponent of the communication unit 245.

The DSRC unit 210 may include hardware and software configured to transmit and receive DSRC messages. The hardware may include an antenna configured to receive and transmit DSRC messages. The software may include code and routines configured to prepare and transmit DSRC messages via the DSRC antenna. The software may be configured to analyze DSRC messages received via the antenna and determine the content of the DSRC messages including any data included in the received DSRC messages. The data included in any received or transmitted DSRC messages may be stored as message data 281 stored on the memory 227.

The DSRC unit 210 may use the 5.9 gigahertz (GHz) band for wireless communications with a bandwidth of substantially 75 megahertz (MHz) and a range of substantially 0 to 1000 meters (m).

In some implementations, the DSRC unit 210 may include an RSU or an OBU. In some implementations, the DSRC unit 210 may be configured to transmit messages in accordance with one or more of the following standards (or any predecessor or derivative thereof): IEEE 802.11; IEEE 802.11p; IEEE 1609.1; IEEE 1609.2; IEEE 1609.3; IEEE 1609A; EN 12253:2004; EN 12795:2002; EN 12834:2002; EN 13372:2004; and EN ISO 14906:2004.

In some implementations, the DSRC unit 210 may be an element or a subcomponent of the communication unit 245.

The wireless fidelity antenna 212 may include hardware and software configured to transmit and receive wireless fidelity messages. The hardware may include a Wi-Fi™ antenna configured to receive and transmit wireless fidelity messages. The software may include code and routines configured to prepare and transmit wireless fidelity messages via the wireless fidelity antenna 212. The software may be configured to analyze wireless fidelity messages received via the wireless fidelity antenna 212 and determine the content of the wireless fidelity messages including any data included in the received wireless fidelity messages. The data included in any received or transmitted wireless fidelity messages may be stored as message data 281 stored on the memory 227.

In some implementations, the wireless fidelity antenna 212 may include a device operating in accordance with the IEEE 802.11 standards or any derivative thereof.

In some implementations, the wireless fidelity antenna 212 may be an element or a subcomponent of the communication unit 245.

The cellular antenna 214 may include hardware and software configured to transmit and receive cellular messages. The hardware may include a cellular antenna configured to receive and transmit cellular messages. The software may include code and routines configured to prepare and transmit cellular messages via the cellular antenna 214. The software may be configured to analyze cellular messages received via the antenna and determine the content of the cellular messages including any data included in the received cellular messages. The data included in any received or transmitted cellular messages may be stored as message data 281 stored on the memory 227.

The cellular antenna 214 may be configured to transmit and receive messages via 3G, 4G, Long-Term Evolution (LTE), LTE Advanced or 5G communication technology, or any derivative of one or more of these technologies.

The processor 225 includes an arithmetic logic unit, a microprocessor, a general-purpose controller, or some other processor array to perform computations. In some implementations, the processor 225 may provide electronic display signals to a display device. The processor 225 is coupled to the bus 220 for communication with the other components via a signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2A includes a single processor 225, multiple processors 225 may be included. Other processors, operating systems, sensors, displays, and physical configurations may be possible.

The sensor set 216 includes one or more of the following sensors: a camera; a LIDAR sensor; a laser altimeter; a navigation sensor (e.g., a global positioning system (GPS) sensor); an infrared detector; a motion detector; a thermostat; a sound detector; a clock configured to provide a time or a timestamp; a compass configured to provide bearing of a moving communication system 191; an odometer configured to provide a speed of the moving communication system 191; and any other type of sensors. The sensors included in the sensor set 216 may record measurements of the physical environment.

The sensors included in the sensor set 216 may record measurements describing another communication device 103. For example, one or more of the sensors included in the sensor set 216 may record measurements describing the present time, the estimated location of a communication device 103 at the present time, the estimated speed of the communication device 103 at the present time and the estimated bearing of the communication device at the present time.

The measurements recorded by the sensors included in the sensor set 216 may be stored as sensor data 283 on the memory 227. The sensor data 283 may describe one or more of the measurements recorded by the sensors included in the sensor set 216.

The sensor data 283 may be organized as a database or some other data structure. In some implementations, the measurements described by the sensor data 283 may be indexed based on a combination of a timestamp describing when the measurements were recorded and an identifying describing a communication device 103 that is described by the measurements. For example, a subset of the sensor data 283 may be associated with (1) a certain time at which the measurements described by the subset were recorded and (2) an identifier indicating which communication device 103 is described by the subset. In this way, the measurements may be sortable based on time and/or the communication device 103 described by the measurements.

For example, a first subset of the sensor data 283 may indicate that at a certain time, "t," a vehicle "V" was observed at location "L" and was traveling at speed "S" and at bearing "Z." A second subset of the sensor data 283 may indicate at a certain time "t+1" the same vehicle "V" was observed at location "L+1" and was traveling at speed "s" and at bearing "Z." It is to be understood this is a simplified example presented by way of illustration, and not intended to be limiting. The location may be indicated by GPS coordinates of the vehicle or any other communication device 103 that is being measured by the sensors of the sensor set 216

The memory 227 stores instructions or data that may be executed by the processor 225. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2A, the memory 227 stores the message data 281 and the sensor data 283.

The communication unit 245 transmits and receives data to and from at least one of the server 107 and other communication devices 103. The communication unit 245 is coupled to the bus 220 via a signal line 246. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the communication devices 103 or other communication channels using one or more wireless communication methods, including IEEE 802.11, IEEE 802.11p, IEEE 802.16, IEEE 1609.1, IEEE 1609.2, IEEE 1609.3, IEEE 1609.4, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The automated driving system 247 includes hardware and software necessary to provide an autonomous or semi-autonomous driving service for a vehicle. The automated driving system 247 may not be included in the device 200 if the communication device 103 is not a vehicle.

The messages received from other communication devices 103 via millimeter wave communication may include one or more of the following: (1) high definition three dimensional maps; and (2) local sensor information. The high definition three dimensional maps the local sensor information may be stored in the memory as message data 281.

The automated driving system 247 may access and use one or more of the high definition three dimensional maps and the local sensor information to provide the automated driving service for the vehicle.

The high definition three dimensional maps may describe the geographical area and roadways where the vehicle is traveling at the moment. In some implementations, the high definition three dimensional maps may include more than 480 horizontal lines per image or frame. In some implementations, the high definition three dimensional maps may include more than 2560×1440 pixels in a 16:9 aspect ratio per frame.

The high definition three dimensional maps may enable the automated driving system 247 to function without having to store all the high definition three dimensional maps for an entire country or state (e.g., the United States or California). Instead, when the vehicle enters a new geographical area it may perform one or more of the following steps: (1) delete the other high definition three dimensional maps that are not associated with the new geographical area; and (2) engage in millimeter wave communication with a communication device (e.g., an RSU) to receive the high definition three dimensional maps for the new geographical area. In some implementations, the communication system 191 may be configured to automatically delete other high definition three dimensional maps upon receipt of the new high definition three dimensional maps for the geographical location or area where the vehicle is presently traveling. This process of receiving, storing and using only the high definition three dimensional maps for the geographical areas where the vehicle is present beneficially provides reduced use of the memory 227 and a more effective and easier way to keep all high definition three dimensional maps stored in the memory 227 updated to be the most recent versions of these maps.

Since the high definition three dimensional maps are many gigabytes in size (e.g., substantially 1 gigabyte to 1000 gigabytes), they may not be transmitted to the vehicle via DSRC, wireless fidelity, cellular, Bluetooth®, etc. Accordingly, the communication system 191 beneficially enables millimeter wave communication in a vehicular environment where (1) the communication devices 103 travel at speeds that are greater than the walking speed of a human (e.g., about 3 miles per hour to 5.7 miles per hour) and (2) the communication devices 103 that are communicating with one another are located 0.1 meters to 2000 meters in range from one another (or substantially 0.1 meters to substantially 2000 meters in range from one another). The communication devices 103 may therefore use their millimeter wave communication units 208 to send and receive data including, among other things, high definition three dimensional maps. Further benefits of the communication system 191 are described below, for example, with reference to FIG. 9.

In some implementations, responsive to receiving message data describing the set of high definition three dimensional maps, the vehicle may proactively delete one or more other sets of high definition three dimensional maps stored in a memory of the vehicle that do not describe the geographical area where the vehicle is traveling at a specified time The local sensor information may describe one or more physical properties of the area proximate to the vehicle. For example, the local sensor information may include sensor measurements (such as that stored as sensor data 283) captured by another communication device 103. The local sensor information may provide the vehicle that receives it with sensor coverage for non-line-of-sight views. The local sensor information may be aggregated from among many different communication devices 103 (e.g., two, three, dozens or hundreds of communication devices 103). In some implementations, the vehicle (or the automated driving system 247) may use the local sensor information to provide a safer and more proactive driving experience to the driver and passengers of the vehicle. In some implementations, the vehicle (or the automated driving system 247) may use the local sensor information to monitor the proximate traffic and provide efficient traffic management and maneuvering when providing an automated driving service.

Since the local sensor information are many gigabytes in size (e.g., substantially 1 gigabyte to 1000 gigabytes), they may not be transmitted to the vehicle via DSRC, wireless fidelity, cellular, Bluetooth®, etc. Accordingly, the communication system 191 beneficially enables millimeter wave communication in a vehicular environment where (1) the communication devices 103 travel at speeds that are greater than the walking speed of a human (e.g., about 3 miles per hour to 5.7 miles per hour) and (2) the communication devices 103 that are communicating with one another are located 0.1 meters to 2000 meters in range from one another (or substantially 0.1 meters to substantially 2000 meters in range from one another). The communication devices 103 may therefore use their millimeter wave communication units 208 to send and receive data including, among other things, local sensor information.

In the illustrated implementation shown in FIG. 2A, the communication system 191 includes a communication module 202, a beam alignment module 204 and a device discovery module 206. These components of the communication system 191 are communicatively coupled to each other via the bus 220. The communication module 202 may be communicatively coupled to the bus 220 via signal line 222. The beam alignment module 204 may be communicatively coupled to the bus 220 via signal line 224. The device discovery module 206 may be communicatively coupled to the bus 220 via signal line 226.

In some implementations, modules of the communication system 191 can be stored in a single server or device. In some other implementations, modules of the communication system 191 can be distributed and stored across multiple servers or devices. Furthermore, the separation of various components, modules, and servers in the implementations described herein should not be understood as requiring such separation in all implementations. In some implementations, the described components, modules, devices, or servers can generally be integrated together in a single component, module, device, or server.

The communication module 202 can be software including routines for handling communications between the communication system 191 and other components of the computing device 200. In some implementations, the communication module 202 can be a set of instructions executable by the processor 225 to provide the functionality described below for handling communications between the communication system 191 and other components of the computing device 200. In some implementations, the communication module 202 can be stored in the memory 227 of the computing device 200 and can be accessible and executable by the processor 225.

The communication module 202 sends and receives data, via the communication unit 245, to and from one or more of the server 107 and other communication devices 103. For example, the communication module 202 receives, via the communication unit 245, message data 281 from a communication device 103 and sends message data 281 to the communication device 103.

In some implementations, the communication module 202 receives data from components of the communication system 191 and stores the data in one or more of the storage device 241 and the memory 227. In some implementations, the communication module 202 retrieves data from the memory 227 and sends the data to one or more components of the communication system 191. In some implementations, the communication module 202 may handle communications between components of the communication system 191.

The beam alignment module 204 can be software including routines for providing beam alignment for the millimeter wave communication unit 208. In some implementations, the beam alignment module 204 can be a set of instructions executable by the processor 225 to provide the functionality described below for providing beam alignment for the millimeter wave communication unit 208. In some implementations, the beam alignment module 204 can be stored in the memory 227 of the computing device 200 and can be accessible and executable by the processor 225.

The device discovery module 206 can be software including routines for providing device discovery for the millimeter wave communication unit 208. In some implementations, the device discovery module 206 can be a set of instructions executable by the processor 225 to provide the functionality described below for providing device discovery for the millimeter wave communication unit 208. In some implementations, the beam alignment module 204 can be stored in the memory 227 of the computing device 200 and can be accessible and executable by the processor 225. For example, the processor 225 may execute the device discovery module 206 and the device discovery module 206 may execute one or more of the steps of the method 800 described below with reference to FIG. 8.

In some implementations, the communication system 191 may not include each of the following elements: a DSRC unit 210; a wireless fidelity antenna 212; and a cellular antenna 214. For example, some communication systems 191 may include a DSRC unit 210 but not a wireless fidelity antenna 212 or a cellular antenna 214.

Figure 2B:
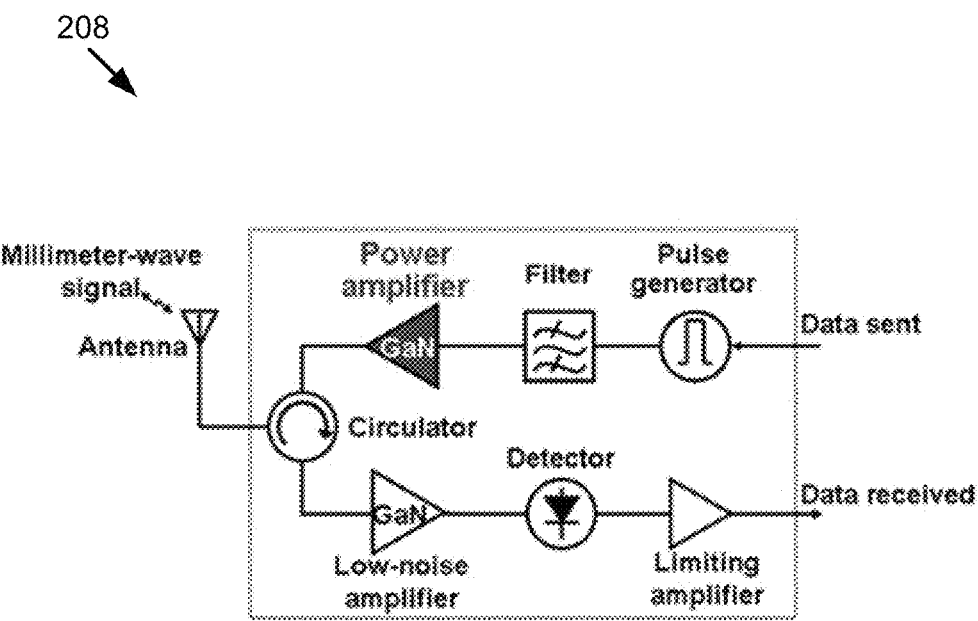
FIG. 2B is a block diagram illustrating example hardware of a millimeter wave communication unit.

Referring now to FIG. 2B, an example of the hardware for a millimeter wave communication unit 208 is described. The example millimeter wave communication unit 208 shown in FIG. 2B is intended to be illustrative, and not limiting of the scope of the specification.

Beam Alignment

Referring now to FIG. 3A, an example of a system 300 including a transmitter 305 performing a beam alignment for a millimeter wave communication unit 208 (not pictured) of the transmitter 305 based on DSRC data included in a DSRC message 312 transmitted by a receiver 310 is described. In some implementations, the beam alignment enables the transmitter 305 to transmit a millimeter wave communication to the receiver 310.

The transmitter 305 may be a communication device 103. The receiver 310 may be a communication device 103.

In some implementations, one or more of the transmitter 305 and the receiver 310 may include at least one vehicle that is traveling at a speed greater than the maximum walking speed of a human. The maximum walking speed for a human may be 5.7 miles per hour.

In some implementations, the vehicle may be traveling at a speed ranging from 5.7 miles per hour to 100 miles per hour. For example, the vehicle may be traveling at a speed of 67 miles per hour.

The transmitter 305 and the receiver 310 may be located a distance from one another. In some implementations, this distance may be a range of 0.1 to 500 meters. In some implementations, this distance may be a range of substantially 0.1 to substantially 500 meters.

The transmitter 304 and the receiver 310 may each include a millimeter wave communication unit 208.

The transmitter 305 and the receiver 310 may each include a DSRC unit 210 (not pictured). The DSRC unit 210 of the receiver 310 may enable the receiver 310 to transmit DSRC message 312.

The DSRC message 312 transmitted by the receiver 310 may include DSRC data describing the receiver 310. In some implementations, the DSRC data may be digital data describing one or more of the following: a location of the receiver 310; a speed of the receiver 310; a bearing of the receiver 310; a time when the location, speed and bearing of the receiver 310 was recorded by the communication system 191 of the receiver 310; a description of the communication capabilities of the receiver 310; and a unique identifier of the receiver 310. In some implementations this DSRC message 312 may be referred to as a receiver identifier message.

In some implementations, the receiver 310 may include onboard sensors that measure and record sensor data 283 describing the time, location, speed and bearing of the receiver 310. The receiver 310 may store the sensor data 283 on a memory 227 of the receiver 310. The communication system 191 of the receiver 310 may use this sensor data 283 to build the DSRC message 312 that is transmitted to the transmitter 305.

The description of the communication capabilities of the receiver 310 may describe which types of wireless communications are supported by the communication system 191 of the receiver 310. For example, the communication system 191 of the receiver 310 may support one or more of the following wireless communication types: millimeter wave communication; DSRC; wireless fidelity, Bluetooth™; cellular (e.g., 3G, 4G, LTE, LTE Advanced, 5G, etc.); and any derivative thereof. For example, if the description of the communication capabilities of the receiver 310 indicates that the receiver 310 supports millimeter wave communication, DSRC and wireless fidelity communication, then the communication system 191 of the receiver 310 may include a millimeter wave communication unit 208, a DSRC unit 210 and a wireless fidelity antenna 212.

In some implementations, the DSRC unit 210 of the receiver 310 may include code and routines configured to cause the DSRC unit 210, when executed by the processor 225, to automatically: (1) update the DSRC data to describe current information about the receiver 310 (e.g., the current location, the current speed, the current bearing, the current time, etc.); and (2) transmit a new DSRC message 312 every 100 milliseconds (or substantially every 100 milliseconds) including the updated DSRC data describing the receiver 310.

The DSRC unit 210 of the transmitter 305 may enable the transmitter 305 to receive the DSRC message 312 transmitted by the receiver 310. The DSRC unit 210 of the transmitter 305 may analyze the DSRC message 312 and determine the content of the DSRC message 312. The content of the DSRC message 312 may include the DSRC data. The DSRC data may be an example of the message data 281 described above with reference to FIG. 2A.

The communication system 191 of the transmitter 305 includes a beam alignment module 204 as described above with reference to FIG. 2A.

The beam alignment module 204 of the transmitter 305 may include code and routines configured to analyze the DSRC data to determine one or more of the following: the location of the receiver 310; the speed of the receiver 310; the bearing of the receiver 310; the time when the location, speed and bearing of the receiver 310 was recorded by the communication system 191 of the receiver 310; the description of the communication capabilities of the receiver 310; the description of the communication capabilities of the receiver 310; and the unique identifier of the receiver 310.

For example, responsive to being executed by the processor 225 of the communication system 191, the beam alignment module 204 of the transmitter 305 may analyze the DSRC data included in the DSRC message 312 and determine (1) the time "T" when the location, speed and bearing of the receiver 310 was recorded by the communication system 191 of the receiver 310 and (2) the location, speed and bearing of the receiver 310.

The beam alignment module 204 of the transmitter 305 may include code and routines configured to estimate the future location and future speed of the receiver 310 at a future time (e.g., time "T+1") based on one or more of the following: (1) location of the receiver 310 at time "T"; (2) the bearing of the receiver 310 at time "T; (3) and the speed of the receiver 310 at time "T". Optionally, the beam alignment module 204 of the transmitter 305 may also include code and routines configured to estimate the future bearing of the receiver 310 at a future time (e.g., time "T+1") based on one or more of the following: (1) location of the receiver 310 at time "T"; (2) the bearing of the receiver 310 at time "T; (3) and the speed of the receiver 310 at time "T".

For example, responsive to being executed by the processor 225 of the communication system 191, the beam alignment module 204 of the transmitter 305 may estimate one or more of the following based on the DSRC data included in the DSRC message 312: the future location of the receiver 310 at a future time (e.g., "T+1); the future speed of the receiver 310 at the future time (e.g., "T+1); and the future bearing of the receiver 310 at the future time (e.g., "T+1"). In some implementations, one or more of the estimated future time, estimated future location, estimated future speed and estimated future bearing of the receiver 310 may be described as "estimated future receiver data."

The beam alignment module 204 of the transmitter 305 may include code and routines configured to perform a beam alignment operation based on the estimated future receiver data. For example, responsive to being executed by the processor 225 of the communication system 191, the beam alignment module 204 of the transmitter 305 may sweep the beam of the millimeter wave communication unit 208 of the transmitter 305 so that any beam transmitted by the millimeter wave communication unit 208 of the transmitter 305 at the future time indicated by the estimated future receiver data (e.g., "T+1") is aligned with the millimeter wave communication unit 208 of the receiver 310 (or the antenna of the millimeter wave communication unit 208 of the receiver 310).

In some implementations, the beam alignment module 204 of the transmitter 305 may sweep the beam of the millimeter wave communication unit 208 of the transmitter 305 based on one or more of the following: the future location of the receiver 310 at a future time (e.g., "T+1); the future speed of the receiver 310 at the future time (e.g., "T+1); and the future bearing of the receiver 310 at the future time (e.g., "T+1").

In some implementations, sweeping the beam of the of the millimeter wave communication unit 208 of the transmitter 305 may include repositioning the antenna of the millimeter wave communication unit 208 of the transmitter 305 or electronically redirecting the transmission of the millimeter wave communication unit 208 of the transmitter 305 so that the any millimeter wave communication transmitted by the millimeter wave communication unit 208 of the transmitter 305 is aligned with the estimated future location of the receiver 310. Sweeping the beam of the of the millimeter wave communication unit 208 of the transmitter 305 therefore enables effective millimeter wave communications among the transmitter 305 and the receiver 310.

The communication system 191 of the transmitter 305 may transmit a millimeter wave communication 314 to the receiver 310 after the beam alignment module 204 completes performance of the beam alignment operation.

In some implementations, the DSRC unit 210 of the receiver 310 may be configured to transmit the DSRC message 312 on a selected channel that is known to the communication system 191 of the transmitter 305 and monitored by the communication system 191 of the transmitter 305.

The above description of FIG. 3A requires the transmitter 305 and the receiver 310 to each include a DSRC unit 210 and a millimeter wave communication unit 208. However, in practice some communication devices 103 may not include a DSRC unit 210. The description of FIG. 3B provided below is one example solution for providing beam alignment by the beam alignment module 204 when the receiver 310 does not include a DSRC unit 210 or is too far away from the transmitter 305 to provide a DSRC message 312 to the transmitter 305.

Referring now to FIG. 3B, an example of a system 399 including a transmitter 305 performing a beam alignment for a millimeter wave communication unit 208 (not pictured) of the transmitter 305 based on sensor data 283 describing a receiver 310 is described.

The transmitter 305 may be a communication device 103. The receiver 310 may be a communication device 103. In some implementations, one or more of the transmitter 305 and the receiver 310 may include a vehicle that is traveling at a speed greater than 5.7 miles per hour. The transmitter 305 and the receiver 310 may be located a distance from one another. In some implementations, this distance may be a range of 0.1 to 2000 meters. In some implementations, this distance may be a range of substantially 0.1 to substantially 2000 meters.

The transmitter 305 and the receiver 310 may include a millimeter wave communication unit 208. The transmitter 305 may include a sensor set 216 and a beam alignment module 204. The beam alignment module 204 of the transmitter 305 may include code and routines configured to cause one or more sensors included in the sensor set 216 to record one or more sensor measurements 316 describing the receiver 310.

The sensor measurements 316 may be stored as sensor data 283 by the communication system 191. The sensor data describing the one or more sensor measurements 316 may describe one or more of the following: a time "T" at which the sensor measurements 316 were recorded; a location of the receiver 310 at the time "T"; a speed of the receiver 310 at the time "T"; and a bearing of the receiver at the time "T".

The beam alignment module 204 of the transmitter 305 may include code and routines configured to estimate the future location and future speed of the receiver 310 at a future time (e.g., time "T+1") based on the sensor data describing the one or more sensor measurements 316. Optionally, the beam alignment module 204 of the transmitter 305 may also include code and routines configured to estimate the future bearing of the receiver 310 at a future time (e.g., time "T+1") based on the sensor data describing the one or more sensor measurements 316.

For example, responsive to being executed by the processor 225 of the communication system 191, the beam alignment module 204 of the transmitter 305 may estimate one or more of the following based on describing the one or more sensor measurements 316: the future location of the receiver 310 at a future time (e.g., "T+1); the future speed of the receiver 310 at the future time (e.g., "T+1); and the future bearing of the receiver 310 at the future time (e.g., "T+1"). In some implementations, one or more of the estimated future time, estimated future location, estimated future speed and estimated future bearing of the receiver 310 may be described as "estimated future receiver data."

The beam alignment module 204 of the transmitter 305 may include code and routines configured to perform a beam alignment operation based on the estimated future receiver data. For example, responsive to being executed by the processor 225 of the communication system 191, the beam alignment module 204 of the transmitter 305 may sweep the beam of the millimeter wave communication unit 208 of the transmitter 305 so that any beam transmitted by the millimeter wave communication unit 208 of the transmitter 305 at the future time indicated by the estimated future receiver data (e.g., "T+1") is aligned with the millimeter wave communication unit 208 of the receiver 310 (or the antenna of the millimeter wave communication unit 208 of the receiver 310).

In some implementations, the beam alignment module 204 of the transmitter 305 may sweep the beam of the millimeter wave communication unit 208 of the transmitter 305 based on one or more of the following: the future location of the receiver 310 at a future time (e.g., "T+1); the future speed of the receiver 310 at the future time (e.g., "T+1); and the future bearing of the receiver 310 at the future time (e.g., "T+1").

The communication system 191 of the transmitter 305 may transmit a millimeter wave communication 318 to the receiver 310 after the beam alignment module 204 completes performance of the beam alignment operation.

Figure 4:
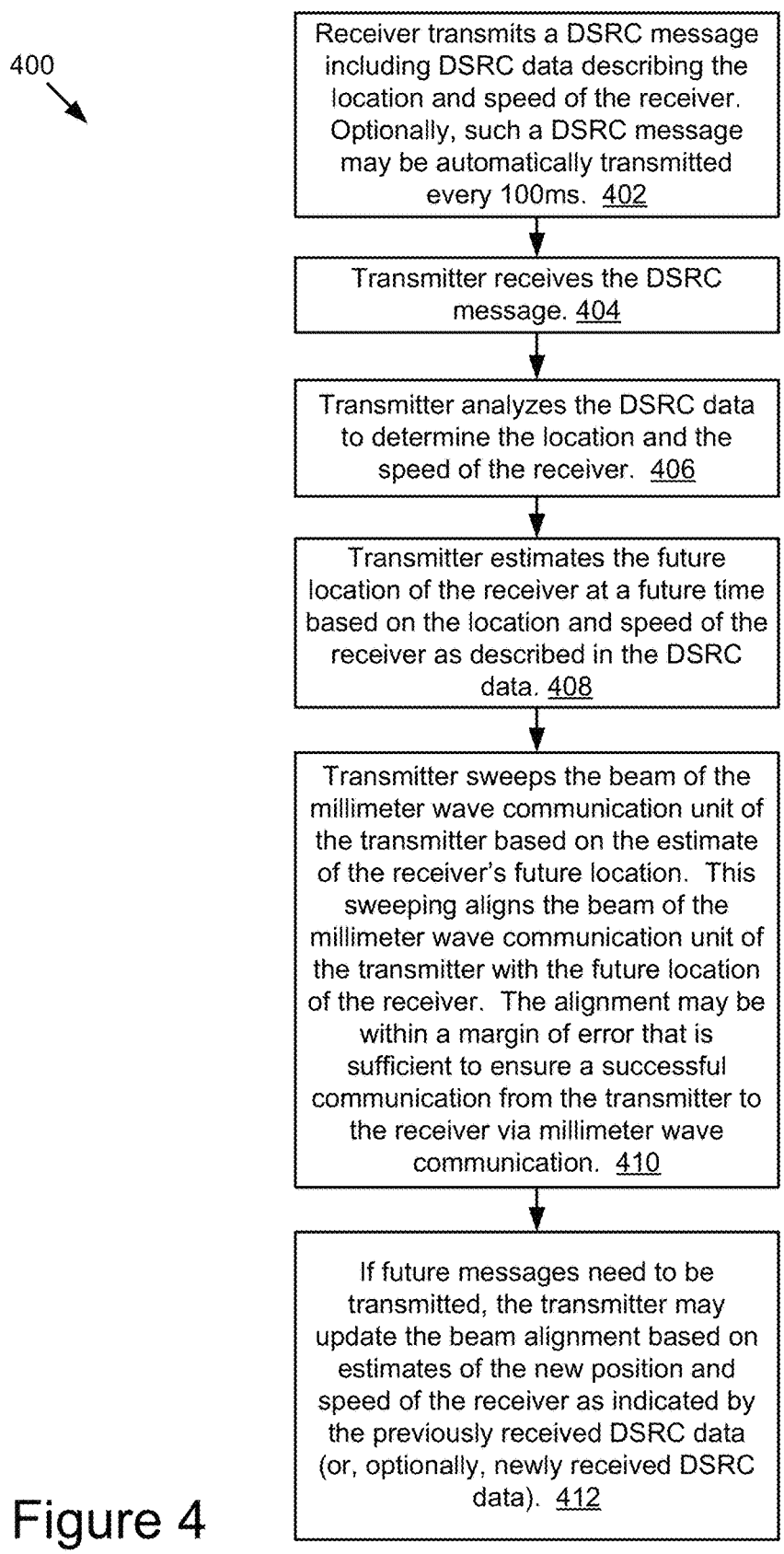
FIG. 4 is a block diagram illustrating a flow chart of an example method for a transmitter to perform a beam alignment operation for a millimeter wave communication unit of the transmitter based on DSRC data included in a DSRC message transmitted by a receiver.

Referring now to FIG. 4, an example method 400 for a transmitter 305 to perform a beam alignment operation for a millimeter wave communication unit 208 of the transmitter 305 based on DSRC data included in a DSRC message 312 transmitted by a receiver 310 is described.

The receiver 310 may transmit 402 a DSRC message 312 including DSRC including DSRC data describing the location and speed of the receiver 310. Optionally, such a DSRC message may be automatically transmitted every 100 ms. In some implementations, the DSRC data included in the DSRC message describes the location, speed and bearing of the receiver 310 at a time "T" specified by the DSRC data included in the DSRC message 312.

The transmitter 305 may receive 404 the DSRC message.

The transmitter 305 may analyze 406 the DSRC data included in the DSRC message 312 to determine the location and the speed of the receiver 310. For example, the communication system 191 of the transmitter 305 may analyze the DSRC data included in the DSRC message 312 to determine the location and speed of the receiver 310 at the specified time "T". Optionally, the transmitter 305 may analyze 406 the DSRC data included in the DSRC message 312 to determine the location, speed and bearing of the receiver 310 at the specified time "T".

The transmitter 305 may estimate 408 the future location of the receiver 310 at a future time "T+1" based on the location and speed of the receiver 310 at the specified time "T" as described in the DSRC data. Optionally, the transmitter 305 may estimate 408 the future location of the receiver 310 at a future time "T+1" based on the location, speed and bearing of the receiver 310 at the specified time "T".

The transmitter 305 may sweep 410 the beam of the millimeter wave communication unit 208 based on the estimate of the future location of the receiver 310. This sweeping aligns the beam of the millimeter wave communication unit 208 of the transmitter 305 with the antenna of the communication unit 208 of the receiver 310. The alignment may be within a margin of error that is sufficient to ensure a successful communication from the transmitter 305 to the receiver 310 via millimeter wave communication. A successful communication may include a communication that is received by the receiver 310 and whose content is discernable or capable of retrieval by the receiver 310.

If future messages need to be transmitted by the transmitter 305, the transmitter 305 may update 412 the beam alignment of the millimeter wave communication unit of the transmitter 305 based on estimates of the new position and speed of the receiver 310 as indicated by the previously received DSRC data (or, optionally, newly received DSRC data transmitted by the receiver 310).

Figure 5:
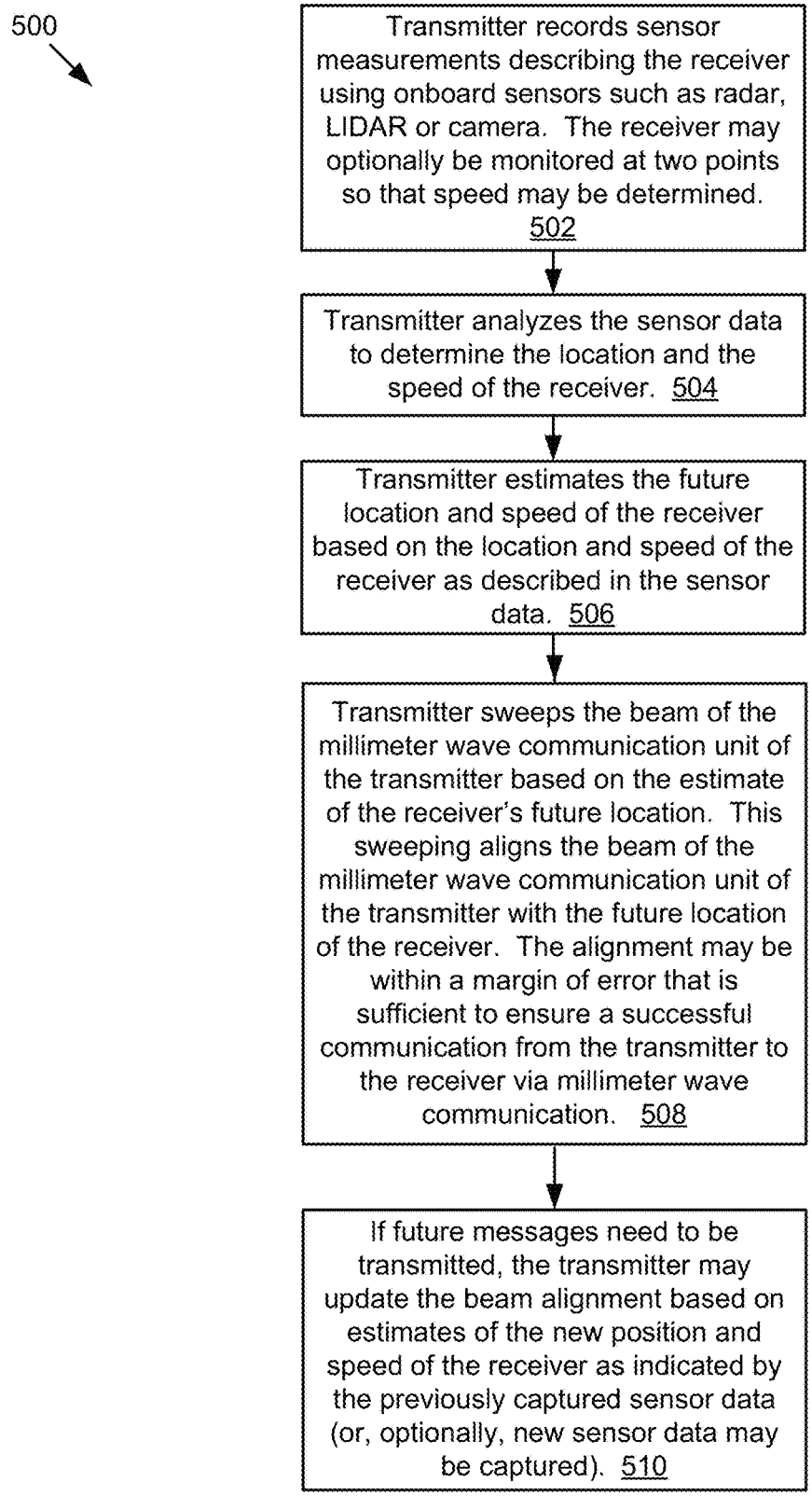
FIG. 5 is a block diagram illustrating a flow chart of an example method for a transmitter to perform a beam alignment operation for a millimeter wave communication unit of the transmitter based on sensor data describing a receiver.

Referring now to FIG. 5, an example method 500 for a transmitter 305 to perform a beam alignment operation for a millimeter wave communication unit 208 of the transmitter 305 based on sensor data 283 describing a receiver 310 is described.

The transmitter 305 may record 502 sensor measurements 316 describing the receiver 310 using onboard sensors such as radar, LIDAR or camera. These sensor measurements 316 may be stored as sensor data 283 that describes the sensor measurements 316. The receiver 310 may optionally be monitored at two points by the sensors of the transmitter 305 so that speed may be determined. The sensor data 283 may describe one of more of the following: a time "T" at which the sensor measurements 316 were recorded; a location of the receiver 310 at the time "T"; a speed of the receiver 310 at the time "T"; and a bearing of the receiver at the time "T".

The transmitter 305 may analyze 504 the sensor data 283 to determine the location and the speed of the receiver 310. Optionally, the transmitter 305 may analyze 504 the sensor data 283 to determine the location, speed and bearing of the receiver 310 at the time "T".

The transmitter 305 may estimate 506 the future location and speed of the receiver 310 at a future time "T+1" based on the location and speed of the receiver at time "T" as described in the sensor data 283. Optionally, the transmitter 305 may estimate 506 the future location, future speed and future bearing of the receiver 310 at a future time "T+1" based on the sensor data 283.

The transmitter 305 may sweep 508 the beam of the millimeter wave communication unit 208 of the transmitter 305 based on the estimate of the future location of the receiver 310. This sweeping aligns the beam of the millimeter wave communication unit 208 of the transmitter 305 with the future location of the receiver 310 at the future time "T+1". The alignment may be within a margin of error that is sufficient to ensure a successful communication from the transmitter 305 to the receiver 310 via millimeter wave communication.

If future messages need to be transmitted, the transmitter 305 may update 510 the beam alignment based on estimates of the new position and speed of the receiver 310 as indicated by the previously captured sensor data 283 (or, optionally, new sensor data 283 may be captured described the new location, speed or bearing of the receiver 310).

Referring now to FIG. 6, example benefits 600 of the beam alignment provided by the communication system 191 are depicted.

Device Discovery

Figure 7:
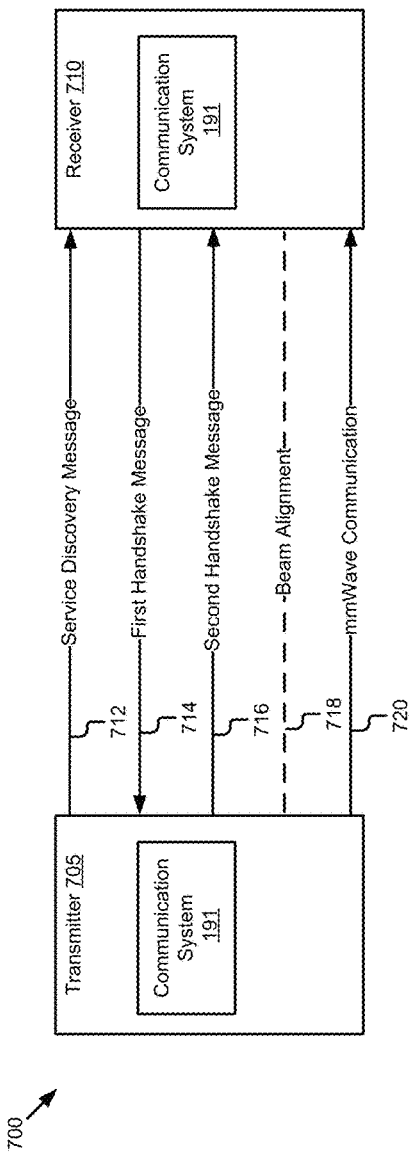
FIG. 7 is a block diagram illustrating an example of a system including a transmitter discovering a device for a millimeter wave communication unit of the transmitter.

Referring now to FIG. 7, described is an example of a system 700 including a transmitter 705 discovering a device for a millimeter wave communication unit 208 (not pictured) of the transmitter 705. The discovered device may be a receiver 710. The transmitter 705 may be a communication device 103. The receiver 710 may be a communication device 103.

In some implementations, one or more of the transmitter 705 and the receiver 710 may include a vehicle that is traveling at a speed greater than 5.7 miles per hour. The transmitter 705 and the receiver 710 may be located a distance from one another. In some implementations, this distance may be a range of 0.1 to 2000 meters. In some implementations, this distance may be a range of substantially 0.1 to substantially 2000 meters.

The transmitter 705 and the receiver 710 each include a millimeter wave communication unit 208.

The transmitter 705 and the receiver 710 may also each include one or more of the following: a DSRC unit 210; a wireless fidelity antenna 212; and a cellular antenna.

The transmitter 705 and the receiver 710 each include at least one or more of the following elements in common so that they may send and receive messages as described below: a DSRC unit 210; a wireless fidelity antenna 212; and a cellular antenna 214. For example, the transmitter 705 and the receiver 710 may each include a DSRC unit 210 so that the service discovery message 712 may be transmitted by the transmitter 705 and received by the receiver 710. Similarly, the transmitter 705 and the receiver 710 may each include a wireless fidelity antenna 212 or a cellular antenna 214 so that the service discovery message 712 may be transmitted by the transmitter 705 and received by the receiver 710.

The transmitter 705 and the receiver 710 each include a communication system 191. The communication system 191 was described above with reference to FIG. 2A, and so, that description will not be repeated here. One or more of the elements 712, 714, 716, 718 and 720 depicted in FIG. 7 may be performed by the device discovery module 206 of the communication systems 191 included in the transmitter 705 and the receiver 710.

The device discovery module 206 of the transmitter 705 may include code and routines configured to transmit a service discovery message 712 via one or more of the following communication methods: DSRC communication; wireless fidelity communication; and cellular communication. The service discovery message 712 may include digital data describing the availability of a millimeter wave communication service. The digital data may describe the millimeter wave communication service. For example, the digital data may indicate that the millimeter wave communication service includes transmission of one or more of the following: one or more high definition three dimensional maps for the geographical area; and local sensor information for the geographic area.

In some implementations, the millimeter wave communication service may include wireless communication with the transmitter 705 via millimeter wave communication. For example, the transmitter 705 may be offering to provide one or more high definition three dimensional maps or local sensor information to a receiver 710 via millimeter wave communication.

In some implementations, the service discovery message 712 may be broadcasted to any receiver 710 that is within range of the transmitter 705 via one or more of the following wireless communication methods: DSRC communication; wireless fidelity communication; and cellular communication.

For example, responsive to being executed by the processor 225 of the communication system 191, the device discovery module 206 of the transmitter 705 may transmit the service discovery message via one or more of the following wireless communication methods: DSRC communication; wireless fidelity communication; and cellular communication.

In some implementations, the device discovery module 206 of the transmitter 705 may include code and routines configured to cycle through one or more of DSRC, wireless fidelity and cellular communication when transmitting the service discovery message. The device discovery module 206 may continue to cycle through these communication methods until a first handshake message 714 is received. For example, the device discovery module 206 may transmit a service discovery message using a different communication method at a regular interval set from 1 millisecond to 1 minute.

The receiver 710 may receive the service discovery message 712. The receiver 710 may analyze the service discovery message 712 to determine the content of the service discovery message 712. The communication application 191 of the receiver 710 may include a device discovery module 206.

In some implementations, the device discovery module 206 of the receiver 710 may include code and routines configured so that, when executed by the processor 225 of the communication system 191 of the receiver 710, they cause the processor 225 to determine whether the communication system 191 of the receiver 710 is capable of millimeter wave communication with the transmitter 705.

For example, when executed by the processor 225 of the communication system 191 included in the receiver 710, the code and routines of the device discovery module 206 included in the receiver 710 may cause the processor 225 to conduct a search or a scan to determine whether the receiver 710 includes a millimeter wave communication unit 208 and, if so, determine whether the conditions present are suitable for millimeter wave communication with the transmitter 705. A condition that may be unsuitable for millimeter wave communication include an error present for the operation of the millimeter wave communication unit 208 of the receiver 710. Example errors include one or more of the following: low power; no power; the antenna for the millimeter wave communication unit 208 is damaged, not responding or non-functioning; full memory; cache error; and a compiler error.

The receiver 710 may not initiate millimeter wave communications with the transmitter 705 if the conditions present are not suitable for millimeter wave communication with the transmitter 705.

In some implementations, the device discovery module 206 of the receiver 710 may include code and routines configured to transmit a message initiating millimeter wave communication with the transmitter 705 of the service discovery message. This message may be referred to as a first handshake message 714. The first handshake message 714 may include digital data describing a request to initiate a millimeter wave communication service. In some implementations, the first handshake message 714 describes a request to receive the millimeter wave communication service from the communication device 103 that broadcasted the service discovery message 712.

For example, when executed by the processor of the communication system 191 included in the receiver 710, the code and routines of the device discovery module 206 included in the receiver 710 may cause the processor 225 to transmit a first handshake message 714 to the transmitter 705.

In some implementations, the first handshake message 714 is transmitted responsive to receiving the service discovery message 712.

In some implementations, the first handshake message 714 may optionally also include digital data describing one or more of the following: a location of the receiver 710; a speed of the receiver 710; a bearing of the receiver 710; a time "T" when the location, speed and bearing of the receiver 710 was recorded by the communication system 191 of the receiver 710; a description of the communication capabilities of the receiver 710; and a unique identifier of the receiver 710.

In some implementations, the receiver 710 may include onboard sensors that measure and record sensor data 283 describing the time, location, speed and bearing of the receiver 710. The receiver 710 may store the sensor data 283 on a memory 227 of the receiver 710. This sensor data 283 may later be used by the communication system 191 of the receiver 710 to build the first handshake message 714.

The transmitter 705 may receive the first handshake message 714. The device discovery module 206 of the transmitter 705 may include code and routines configured to analyze the first handshake message 714. The device discovery module 206 of the transmitter 705 may determine the content of the first handshake message 714. The content of the first handshake message may be stored as message data 281 in a memory 227 of the transmitter 705.

The device discovery module 206 of the transmitter 705 may determine, based on the message data 281 included in the first handshake message 714, that the receiver 710 is requesting to begin a millimeter wave communication service with the transmitter 705.

In some implementations, the device discovery module 206 of the transmitter 705 may include code and routines configured to transmit a message acknowledging initiation of the millimeter wave communication with the receiver 710. This message may be referred to as a second handshake message 716. The second handshake message 716 may include digital data describing an acknowledgement of the request to initiate a millimeter wave communication service.

In some implementations, the communication system 191 of the receiver 710 or the communication system 191 of the transmitter 705 may take steps to perform a beam alignment operation 718 as described above with reference to FIG. 3A, 3B, 4 or 5.

For example, if the first handshake message 714 included digital data describing one or more of the time, location, speed and bearing of the receiver 710, then the beam alignment module 204 of the transmitter 705 may perform a beam alignment operation 718 based on this digital data.

In some implementations, the receiver 710 may transmit a DSRC message 312 including DSRC data describing one or more of the time, location, speed and bearing of the receiver 710. The transmitter 705 may receive this DSRC message 312 and the beam alignment module 204 of the transmitter 705 may use the DSRC data to perform the beam alignment operation 718 for providing millimeter wave communications to the receiver 710.

In some implementations, the transmitter 705 may record sensor measurements 316 describing one or more of the time, location, speed and bearing for the receiver 710 and store sensor data 283 describing these sensor measurements 316. The beam alignment module 204 of the transmitter 705 may use this sensor data 283 to perform a beam alignment operation 718 for providing millimeter wave communications to the receiver 710.

The communication system 191 of the transmitter 705 may transmit a millimeter wave communication 720 to the receiver 710 after the beam alignment 718.

In some implementations, the service discovery message 712 may be transmitted by one or more of the following communication methods or any derivative thereof: DSRC; wireless fidelity; Bluetooth™; and cellular (3G, 4G, LTE, LTE Advanced, 5G).

In some implementations, the first handshake message 714 may be transmitted by one or more of the following communication methods or any derivative thereof: DSRC; wireless fidelity; Bluetooth™; and cellular (3G, 4G, LTE, LTE Advanced, 5G).

In some implementations, the first handshake message 714 is configured so that it is transmitted in the same communication method as the service discovery message 712 received by the receiver 710. For example, if the service discovery message 712 is transmitted via wireless fidelity, then the first handshake message 714 is also transmitted via wireless fidelity.

In some implementations, the second handshake message 716 may be transmitted by one or more of the following communication methods or any derivative thereof: DSRC; wireless fidelity; Bluetooth™; and cellular (3G, 4G, LTE, LTE Advanced, 5G).

In some implementations, the second handshake message 716 is configured so that it is transmitted in the same communication method as the service discovery message 712 received by the receiver 710 and the first handshake message 714 received by the transmitter 705. For example, if the service discovery message 712 is transmitted via wireless fidelity, then the first handshake message 714 is transmitted via wireless fidelity and the second handshake message 716 is also transmitted via wireless fidelity.

Figure 8:
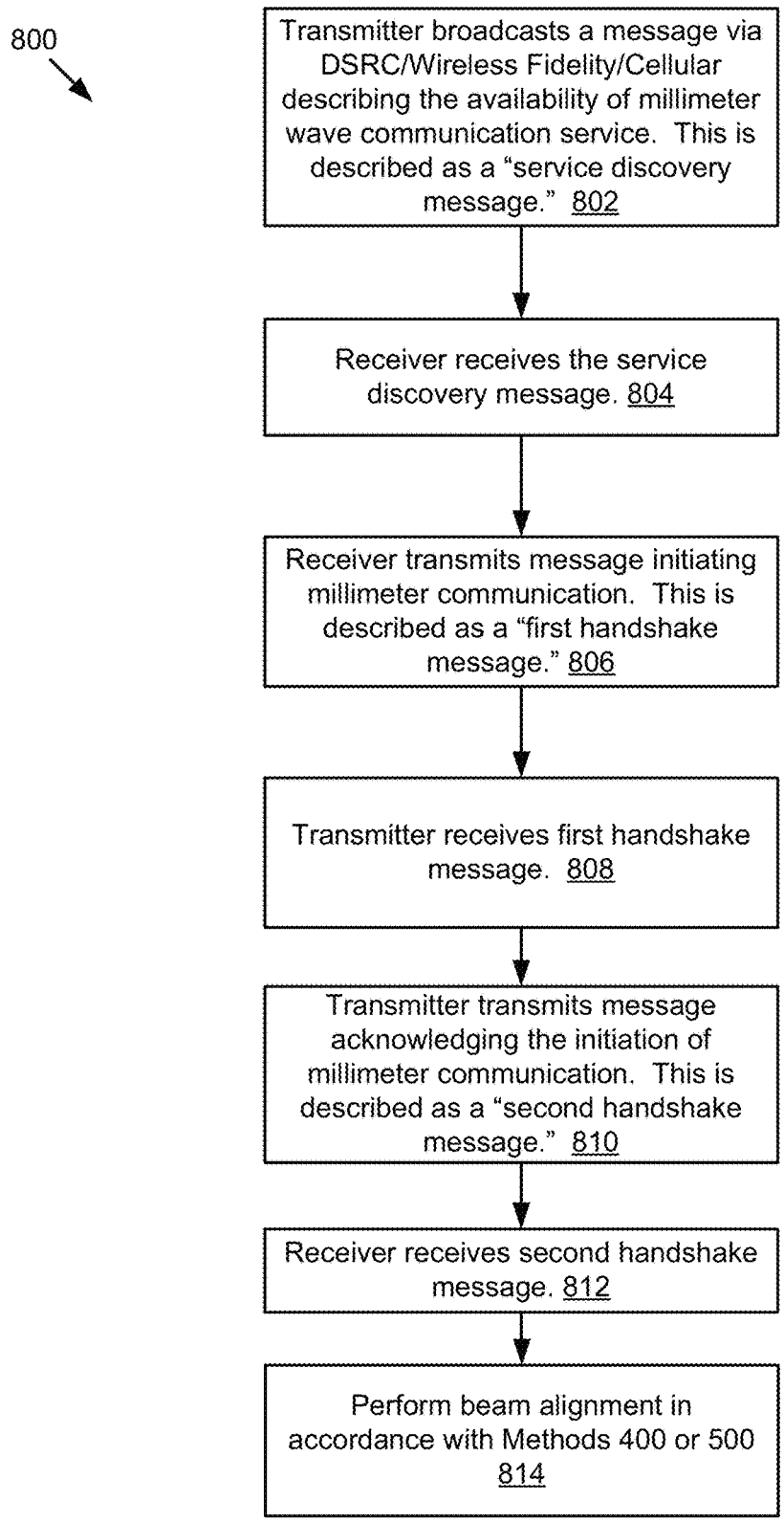
FIG. 8 is a block diagram illustrating a flow chart of an example method for a transmitter to discover a device for a millimeter wave communication unit of the transmitter.

Referring now to FIG. 8, an example method 800 for a transmitter 705 to discover a device for a millimeter wave communication unit 208 of the transmitter 705 is described. The discovered device may be a receiver 710.

In some implementations, one or more of the transmitter 705 and the receiver 710 may include a vehicle that is traveling at a speed greater than 5.7 miles per hour (i.e., maximum walking speed for a human). The transmitter 705 and the receiver 710 may be located a distance from one another. In some implementations, this distance may be a range of 0.1 to 2000 meters. In some implementations, this distance may be a range of substantially 0.1 to substantially 2000 meters.

The transmitter 705 and the receiver 710 each include a millimeter wave communication unit 208.

The transmitter 705 and the receiver 710 may also each include one or more of the following: a DSRC unit 210; a wireless fidelity antenna 212; and a cellular antenna 214.

The transmitter 705 and the receiver 710 each include at least one or more of the following elements in common so that they may send and receive messages as described below: a DSRC unit 210; a wireless fidelity antenna 212; and a cellular antenna 214. For example, the transmitter 705 and the receiver 710 may each include a DSRC unit 210 so that the service discovery message 712 may be transmitted by the transmitter 705 and received by the receiver 710. Similarly, the transmitter 705 and the receiver 710 may each include a wireless fidelity antenna 212 or a cellular antenna 214 so that the service discovery message 712 may be transmitted by the transmitter 705 and received by the receiver 710.

The transmitter 705 and the receiver 710 each include a communication system 191. The communication system 191 was described above with reference to FIG. 2A, and so, that description will not be repeated here.

The device discovery module 206 of the transmitter 705 may broadcast 802 a service discovery message 712 via one or more of the following communication methods: DSRC communication; wireless fidelity communication; and cellular communication. The service discovery message 712 may include digital data describing the availability of a millimeter wave communication service. The millimeter wave communication service may include wireless communication with the transmitter 705 via millimeter wave communication.

In some implementations, the service discovery message 712 may be broadcasted 802 to any receiver 710 that is within range of the transmitter 705 via one or more of the following wireless communication methods: DSRC communication; wireless fidelity communication; and cellular communication.

For example, responsive to being executed by the processor 225 of the communication system 191, the device discovery module 206 of the transmitter 705 may broadcast 802 the service discovery message 712 via one or more of the following wireless communication methods: DSRC communication; wireless fidelity communication; and cellular communication.

In some implementations, the device discovery module 206 of the transmitter 705 may repeat step 802 until a first handshake message is received. While repeating step 802, the device discovery module 206 may cycle through one or more of DSRC, wireless fidelity and cellular communication when transmitting the service discovery message 712. The device discovery module 206 may continue to cycle through these communication methods until a first handshake message 714 is received. For example, the device discovery module 206 may transmit a service discovery message using a different communication method at a regular interval set from 1 millisecond to 1 minute.

The receiver 710 may receive 804 the service discovery message 712. The receiver 710 may analyze the service discovery message 712 to determine the content of the service discovery message 712. The communication application 191 of the receiver 710 may include a device discovery module 206. The device discovery module 206 of the receiver 710 may analyze the content of the service discovery message 712 to determine that the transmitter 705 is offering to provide a millimeter wave communication service.

In some implementations, the device discovery module 206 of the receiver 710 may transmit 806 a message initiating millimeter wave communication with the transmitter 705 of the service discovery message 712. This message may be referred to as a first handshake message 714. The first handshake message 714 may include digital data describing a request to initiate a millimeter wave communication service with the transmitter 705.

In some implementations, the first handshake message 714 is transmitted responsive to receiving the service discovery message 712.

In some implementations, the first handshake message 714 may optionally also include digital data describing one or more of the following: a location of the receiver 710; a speed of the receiver 710; a bearing of the receiver 710; a time "T" when the location, speed and bearing of the receiver 710 was recorded by the communication system 191 of the receiver 710; a description of the communication capabilities of the receiver 710; and a unique identifier of the receiver 710.

In some implementations, the receiver 710 may include onboard sensors (such as the sensor set 216) that measure and record sensor data 283 describing the time, location, speed and bearing of the receiver 710. The receiver 710 may store the sensor data 283 on a memory 227 of the receiver 710. This sensor data 283 may later be used by the communication system 191 of the receiver 710 to build the first handshake message 714.

The transmitter 705 may receive 808 the first handshake message 714. The device discovery module 206 of the transmitter 705 may analyze the first handshake message 714. The device discovery module 206 of the transmitter 705 may determine the content of the first handshake message 714. The content of the first handshake message may be stored as message data 281 in a memory 227 of the transmitter 705.

The device discovery module 206 of the transmitter 705 may determine, based on the message data 281 included in the first handshake message 714, that the receiver 710 is requesting to begin a millimeter wave communication service with the transmitter 705. In this way the device discovery module 206 discovers the identity of the receiver 710 and the willingness of the receiver to receive a millimeter wave communication service from the transmitter 705.

In some implementations, the transmitter 705 may transmit 810 a message acknowledging initiation of the millimeter wave communication with the receiver 710. This message may be referred to as a second handshake message 716. The second handshake message 716 may include digital data describing an acknowledgement of the request to initiate a millimeter wave communication service.

In some implementations, the receiver 710 may receive 812 the second handshake message. The receiver 710 may take steps to prepare to receive and transmit millimeter wave communications with the transmitter 705

In some implementations, the communication system 191 of the receiver 710 or the communication system 191 of the transmitter 705 may take steps to perform step 814 a beam alignment operation 718 as described above with reference to FIG. 3A, 3B, 4 or 5.

For example, if the first handshake message 714 included digital data describing one or more of the time, location, speed and bearing of the receiver 710, then the beam alignment module 204 of the transmitter 705 may perform step 814 a beam alignment operation 718 based on this digital data.

In some implementations, the receiver 710 may transmit a DSRC message 312 including DSRC data describing one or more of the time, location, speed and bearing of the receiver 710. The transmitter 705 may receive this DSRC message 312 and the beam alignment module 204 of the transmitter 705 may use the DSRC data to perform 814 the beam alignment operation 718 for providing millimeter wave communications to the receiver 710.

In some implementations, the transmitter 705 may record sensor measurements 316 describing one or more of the time, location, speed and bearing for the receiver 710 and store sensor data 283 describing these sensor measurements 316. The beam alignment module 204 of the transmitter 705 may use this sensor data 283 to perform 814 a beam alignment operation 718 for providing millimeter wave communications to the receiver 710.

In some implementations, the transmitter 705 and the receiver 710 may be engaged in millimeter wave communications with one another. The beam alignment module 204 of the transmitter 705 may determine that a new beam alignment operation may be performed because of problems identified when communicating with the receiver 710 (e.g., noise or missed messages). The beam alignment module 204 of the transmitter 705 may take steps to repeat step 814 responsive to determining that a new beam alignment operation may be performed.

In some implementations, the service discovery message 712 may be transmitted 802 by one or more of the following communication methods or any derivative thereof: DSRC; wireless fidelity; Bluetooth™; and cellular (3G, 4G, LTE, LTE Advanced, 5G, etc.).

In some implementations, the first handshake message 714 may be transmitted 806 by one or more of the following communication methods or any derivative thereof: DSRC; wireless fidelity; Bluetooth™; and cellular (3G, 4G, LTE, LTE Advanced, 5G, etc.).

In some implementations, the first handshake message 714 is configured so that it is transmitted 806 in the same communication method as the service discovery message 712 received 804 by the receiver 710. For example, if the service discovery message 712 is transmitted 802 via wireless fidelity, then the first handshake message 714 is also transmitted 806 via wireless fidelity.

In some implementations, the second handshake message 716 may be transmitted 810 by one or more of the following communication methods or any derivative thereof: DSRC; wireless fidelity; Bluetooth™; and cellular (3G, 4G, LTE, LTE Advanced, 5G, etc.).

In some implementations, the second handshake message 716 is configured so that it is transmitted 810 in the same communication method as the service discovery message 712 received 804 by the receiver 710 and the first handshake message 714 received 808 by the transmitter 705. For example, if the service discovery message 712 is transmitted 802 via wireless fidelity, then the first handshake message 714 is transmitted 806 via wireless fidelity and the second handshake message 716 is also transmitted 810 via wireless fidelity.

Figure 9:
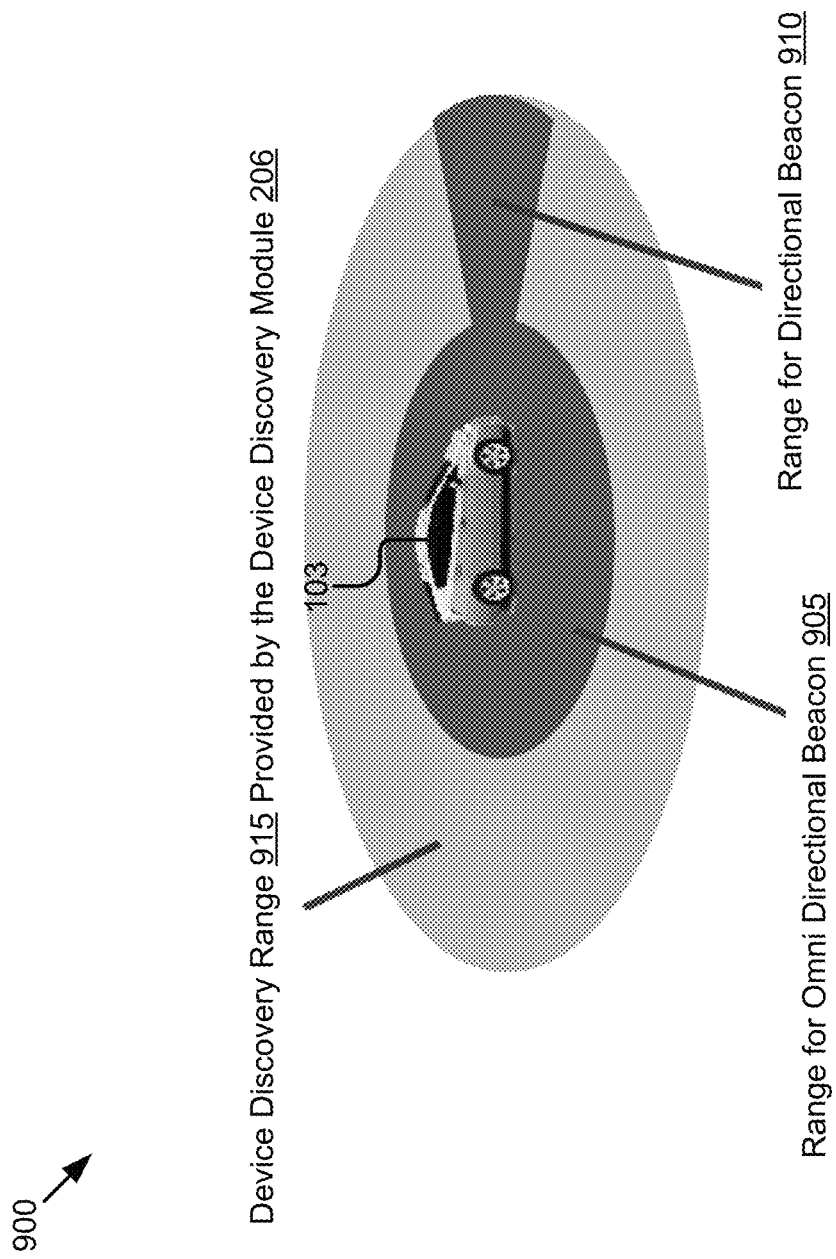
FIG. 9 is a graphic depiction of an example of the extended device discovery range provided by the provided communication system.

Referring now to FIG. 9, a graphical example 900 of the extended device discovery range provided by the provided the communication system 191 (not pictured) is described.

The communication system 191 is an element of the communication device 103. The communication system 191 includes a millimeter wave communication unit 208 for providing a millimeter wave communication service to other communication systems 191 that are within millimeter wave communication range of the of the communication device 103 (e.g., 0.1 to 100 meters or substantially 0.1 to substantially 100 meters).

Accordingly, with reference to FIG. 7, the transmitter 705 may located a distance ranging from substantially 0.1 to substantially 100 meters from the receiver 710 when the millimeter wave communication 720 is transmitted. However, the transmitter 705 may located a distance ranging from substantially 0.1 to substantially 2000 meters from the receiver 710 when one or more of the service discovery message 712, the first handshake message 714 and the second handshake message 716 is transmitted.

In some implementations, the millimeter wave communication unit 208 of one or more of the transmitter 705 and the receiver 710 is configured so that the millimeter communication range is substantially 0.1 to substantially 1700 meters. For example, the millimeter communication unit 208 may include one or more high gain antennas that enable a greater range for millimeter wave communications.

Referring back to FIG. 9. A limitation of millimeter wave communication is that devices may not be able to communicate with one another via millimeter wave communication until a device discovery operation has been performed. The device discovery operation includes a first communication device 103 discovering or otherwise becoming aware of one or more of the following: (1) the presence of a second communication device 103; (2) the ability of the second communication device 103 to receive and transmit millimeter wave communications; and (3) the willingness of the other communication device 103 to receive and transmit millimeter wave communications with the first communication device.

Existing methods for device discovery include: (1) omni directional beacons; and (2) directional beacons.

Omni directional beacons are not suitable for vehicle applications of millimeter wave communications for at least two reasons: (1) omni directional beacons cannot discover devices that are traveling faster than 5.6 miles per hour and vehicles frequently travel faster than 5.6 miles per hour; and (2) the range for an omni directional beacon 905 is only 10 meters and vehicles frequently need to communication with communication devices 103 that are farther away than 10 meters.

Directional beacons are not suitable for vehicle applications of millimeter wave communications for at least two reasons: (1) directional beacons cannot discover devices that are traveling faster than 5.6 miles per hour and vehicles frequently travel faster than 5.6 miles per hour; and (2) the maximum range for a directional beacon 910 is only 100 meters and vehicles frequently need to communication with communication devices 103 that are farther away than 100 meters.

In contrast to omni directional beacons and directional beacons, the device discovery range 915 provided by the device discovery module 206 is 0.1 to 2000 meters (or substantially 0.1 to substantially 2000 meters).

In some implementations, if the service discovery message 712 is transmitted via DSRC with a 5.9 gigahertz carrier frequency then the maximum device discovery range 915 provided by the device discovery module 206 is 500 meters (or substantially 500 meters).

In some implementations, if the service discovery message 712 is transmitted via wireless fidelity with a 2.4 gigahertz to 5 gigahertz carrier frequency then the maximum device discovery range 915 provided by the device discovery module 206 is 200 meters (or substantially 200 meters).

In some implementations, if the service discovery message 712 is transmitted via cellular then the maximum device discovery range 915 provided by the device discovery module 206 is 2000 meters (or substantially 2000 meters).

In further contrast to omni directional beacons and directional beacons, the device discovery provided by the device discovery module 206 can successfully discover devices that are traveling as fast as 30 meters per second (or substantially 30 meters per second).

In some implementations, the device discovery provided by the device discovery module 206 can successfully discover devices that are traveling as fast as 108 kilometers per hour (or substantially 108 kilometers per hour).

In some implementations, the device discovery provided by the device discovery module 206 can successfully discover devices that are traveling as fast as 67 miles per hour per hour (or substantially 67 miles per hour).

In some implementations, the device discovery provided by the device discovery module 206 can successfully discover devices that are traveling as fast as 100 miles per hour per hour (or substantially 100 miles per hour).

Referring now to FIG. 10, example benefits 1000 of the device discovery provided by the communication system 191 are depicted.

Referring to FIG. 1B, in some implementations one or more of the communication devices 103 may communicate with one another via full-duplex wireless communication. For example, the server 107 may include a device registry database or other storage devices for storing other data. The device registry database can be a non-transitory storage medium that stores data for providing some or all of the functionality described herein. The device registry database may be a dynamic random access memory (DRAM) device, a static random access memory (SRAM) device, flash memory, or some other memory devices. In some implementations, the device registry database also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations where one or more of the communication devices communicate via full-duplex wireless communication, the device registry database stores data describing one or more device registry entries related to one or more communication devices 103 registered in the server 107. A device registry entry may include an identifier (ID) of an associated communication device 103 and data indicating whether the associated communication device 103 has DSRC capability. In some implementations, a device registry entry may include data describing a location and a communication environment (e.g., noise, multipath fading, shadow fading, etc.) associated with a communication device 103. In some implementations, the device registry database may store other data for providing the functionality described herein.

In FIG. 1B, the communication devices 103a, 103b, and 103c may access the device registry database via the network 105. However, in some implementations the device registry database may be implemented in a distributed approach. For example, each communication devices 103a, 103b, and 103c may be connected to a separate local device registry database rather than a central device registry database on the cloud.

The communication devices 103a, 103b, and 103c described herein may share a common wireless channel for data communication. For example, the communication devices 103a, 103b, and 103c may be in the same wireless local area network and may take turns to access a radio frequency channel for transmitting data via the radio frequency channel. The communication devices 103a, 103b, and 103c may compete for access to the shared wireless channel based on one or more channel access rules. For example, in an IEEE 802.11 WLAN, the communication devices 103a, 103b, and 103c may compete for access to the common wireless channel using the CSMA/CA MAC protocol.

Assume that the first communication device 103a gains access to the common wireless channel and has unicast packets to transmit to the second communication device 103b. The first communication device 103a may use the wireless channel to continuously transmit the unicast packets to the second communication device 103b until all the available packets addressed to the second communication device 103b have been transmitted. During the transmission of the packets from the first communication device 103a to the second communication device 103b, the second communication device 103b may also use the wireless channel to transmit unicast packets to the first communication device 103a at the same time if full-duplex communication capability is enabled. Other communication devices 103 may listen to the wireless channel and will not transmit packets over the wireless channel to avoid collision. Upon completion of the packet transmission, the first communication device 103a may release the wireless channel so that the other communication devices 103 may compete for access to the wireless channel again.

If the first communication device 103a uses the wireless channel to transmit broadcast packets to multiple destinations, none of the other communication devices 103 may transmit packets over the wireless channel at the same time to avoid collision. During the broadcast packet transmission from the first communication device 103a to multiple destinations, other communication devices 103 may listen to the wireless channel. Upon completion of the packet transmission, the first communication device 103a may release the wireless channel so that other communication devices 103 may compete for access to the wireless channel again.

Throughout the disclosure, the term "full-duplex communication" may describe that a pair of communication devices 103 with full-duplex communication capability may transmit data or signals to each other simultaneously using a common wireless channel. For example, a first communication device 103 and a second communication device 103 with full-duplex communication capability may transmit signals to each other using a common radio frequency channel at the same time. The first communication device 103 is capable of decoding signals from the second communication device 103, and vice versa.

For example, during the full-duplex communication, the first communication device 103 transmits a first signal to the second communication device 103. Simultaneously, the second communication device 103 transmits a second signal to the first communication device 103. As a result, the first communication device 103 and the second communication device 103 may receive a total signal that includes a sum of the first signal and the second signal, respectively. Since the first communication device 103 knows the first signal transmitted by itself, the first communication device 103 is capable of determining the second signal from the second communication device 103 by subtracting the first signal from the total signal (e.g., the second signal≈the total signal−the first signal). Similarly, the second communication device 103 is able to decode the first signal from the first communication device 103 by subtracting the second signal from the total signal.

However, other communication devices 103 that do not know the first signal and the second signal are not able to decode the first signal or the second signal from the total signal. Also, other communication devices 103 cannot transmit data over the wireless channel when the first communication device 103 and the second communication device 103 are transmitting data to each other.

The entirety of U.S. patent application Ser. No. 14/471,387, filed on Aug. 28, 2014 and entitled "Full-Duplex Coordination System," is herein incorporated by reference.

In the preceding description reference is made to time "T" and future time "T+1". It is to be understood that the future time may be any amount of time following time "T".

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
broadcasting, by a first communication device, a service discovery message describing an availability of the first communication device to provide a millimeter wave communication service that includes providing a set of high-definition three-dimensional maps and local sensor information via millimeter wave communication, wherein the service discovery message is broadcasted via dedicated short range communication (DSRC), wherein the first communication device is a first onboard communication device included in a first vehicle;

receiving, by the first communication device, a first handshake message transmitted by a second onboard communication device included in a second vehicle, wherein the first handshake message describes a request to receive the millimeter wave communication service from the first communication device and wherein the first handshake message is received via DSRC and includes DSRC data describing an initial location of the second vehicle at a specified time and one or more of a speed of the second vehicle at the specified time and a bearing of the second vehicle at the specified time;

transmitting, by the first communication device, a second handshake message acknowledging receipt of the first handshake message, wherein the second handshake message is transmitted via DSRC;

analyzing, by the first communication device, the DSRC data to determine a future location of the second vehicle at a future time, wherein the analyzing includes estimating the future location based on the initial location of the second vehicle at the specified time and one or more of the speed of the second vehicle at the specified time and the bearing of the second vehicle at the specified time;

sweeping, by the first communication device, a beam of a first millimeter wave communication unit of the first communication device so that the beam is aligned with the future location of a second millimeter wave communication unit of the second vehicle; and providing, by the first communication device, the millimeter wave communication service to the second vehicle, wherein the millimeter wave communication service includes the first vehicle providing digital data to the second vehicle describing (1) the set of high-definition three-dimensional maps and (2) the local sensor information including a description of a physical environment which is not viewable by the second vehicle.

2. A computer-implemented method comprising:

broadcasting, by a first communication device, a service discovery message describing an availability of the first communication device to provide a millimeter wave communication service that includes providing local sensor information via a millimeter wave communication, wherein the first communication device is a first onboard communication device included in a first vehicle and wherein the service discovery message is broadcasted via a communication method that does not include millimeter wave communication;

discovering, by the first communication device, a second onboard communication device included in a second vehicle by receiving a first handshake message transmitted by the second onboard communication device of the second vehicle, wherein the first handshake message describes a request to receive the millimeter wave communication service from the first communication device and wherein the first handshake message is received via the communication method used for broadcasting the service discovery message, wherein the first handshake message includes first data describing an initial location, a speed and a bearing of the second vehicle at a specified time;

transmitting, by the first communication device, a second handshake message acknowledging receipt of the first handshake message, wherein the second handshake message is transmitted via the communication method used for broadcasting the service discovery message and receiving the first handshake message;

performing, by the first communication device, a beam alignment operation so that a beam of a first millimeter wave communication unit of the first communication device is aligned with an antenna of a second millimeter wave communication unit of the second vehicle, wherein the beam alignment operation is performed based on the first data describing the initial location, the speed and the bearing of the second vehicle at flail the specified time and determining a future location of the second vehicle at a future time based on the first data describing the initial location, the speed and the bearing of the second vehicle at the specified time; and providing, by the first communication device, the millimeter wave communication service to the second vehicle, wherein the millimeter wave communication service includes the first vehicle providing digital data to the second vehicle describing the local sensor information which includes a description of a physical environment for one or more non-line-of-sight views for the second vehicle which is operable to assist the second vehicle in providing an automated driving service.

3. The method of claim 2, wherein the beam alignment operation includes:

sweeping, by the first communication device, a beam of the first millimeter wave communication unit of the first communication device so that the beam is aligned with the future location of the second millimeter wave communication unit of the second vehicle.

4. The method of claim 2, wherein the beam alignment operation includes:

measuring, by a sensor set of the first communication device, sensor measurements describing one or more of the initial location of the second vehicle at the specified time, the speed of the second vehicle at the specified time and the bearing of the second vehicle at the specified time;

storing, by the first communication device, sensor data describing the sensor measurements;

analyzing, by the first communication device, the sensor data to determine the future location of the second vehicle at the future time, wherein the analyzing includes estimating the future location based on one or more of the initial location of the second vehicle at the specified time, the speed of the second vehicle at the specified time and the bearing of the second vehicle at the specified time; and sweeping, by the first communication device, a beam of Hall the first millimeter wave communication unit of the first communication device so that the beam is aligned with the future location of the second millimeter wave communication unit of the second vehicle.

5. The method of claim 2, wherein the first communication device transmits the service discovery message periodically until the first communication device receives the first handshake message.

6. The method of claim 2, wherein the automated driving service of the second vehicle uses the local sensor information describing the physical environment to provide traffic management and maneuvering for the second vehicle.

7. The method of claim 2, wherein the second onboard communication device included in the second vehicle is an on-board unit ("OBU") that is mounted on or inside the second vehicle.

8. The method of claim 2, wherein the first communication device and the second vehicle have a relative speed that is within a range of substantially 5.6 miles per hour and substantially 100.1 miles per hour.

9. The method of claim 2, wherein the first communication device and the second vehicle are separated by a distance that is within a range of substantially 100 meters and substantially 2000.1 meters when the service discovery message is broadcasted.

10. The method of claim 2, wherein the sensor set of the first communication device includes at least one of radar, LIDAR, and a camera.

11. The method of claim 2, wherein the local sensor information is aggregated from a plurality of other communication devices.

12. The method of claim 2, wherein the digital data further describes a set of high-definition three-dimensional maps which describe a geographical area where the second vehicle is traveling at the specified time.

13. The method of claim 12, wherein the second vehicle uses the set of high-definition three-dimensional maps to provide the automated driving service.

14. The method of claim 12, wherein, responsive to receiving the digital data, the second vehicle proactively deletes one or more other sets of high-definition three-dimensional maps stored in a memory of the second vehicle that do not describe the geographical area where the second vehicle is traveling at the specified time.

15. The method of claim 2, wherein the automated driving service of the second vehicle includes one or more of an autonomous driving service or a semi-autonomous driving service.

16. A computer-implemented method comprising:
receiving, by a first onboard communication device included in a first vehicle, a dedicated short range communication (DSRC) message transmitted via DSRC by a second onboard communication device included in a second vehicle, wherein the DSRC message includes DSRC data describing an initial location of the second vehicle at a specified time, a speed of the second vehicle at the specified time and a bearing of the second vehicle at the specified time;
analyzing, by the first onboard communication device, the DSRC data to determine a future location of the second vehicle at a future time, wherein the analyzing includes estimating the future location based on one or more of the initial location of the second vehicle at the specified time, the speed of the second vehicle at the specified time and the bearing of the second vehicle at the specified time;
sweeping, by the first onboard communication device, a beam of a first millimeter wave communication unit of the first onboard communication device so that the beam is aligned with the future location of a second millimeter wave communication unit of the second vehicle; and
providing, by the first onboard communication device a millimeter wave communication service to the second vehicle that includes the first vehicle providing digital data to the second vehicle describing local sensor information including a description of a physical environment for one or more non-line-of-sight views for the second vehicle.

17. The method of claim 16, wherein the second vehicle provides an automated driving service that uses the local sensor information describing the physical environment to provide traffic management and maneuvering for the second vehicle.

18. The method of claim 16, wherein the local sensor information is used to monitor traffic.

19. The method of claim 16, wherein the first vehicle and the second vehicle have a relative speed that is within a range of substantially 5.6 miles per hour and substantially 100.1 miles per hour.

20. The method of claim 16, wherein the first vehicle and the second vehicle are separated by a distance that is within a range of substantially 100 meters and substantially 500.1 meters.

* * * * *